(12) United States Patent
Harada et al.

(10) Patent No.: US 6,959,052 B2
(45) Date of Patent: Oct. 25, 2005

(54) RECEIVING APPARATUS, RECEIVING METHOD, PROGRAM AND INFORMATION RECORDING MEDIUM

(75) Inventors: Hiroshi Harada, Tokyo (JP); Masayuki Fujise, Tokyo (JP); Ryuuhei Funada, Tokyo (JP); Manabu Sawada, Aichi (JP); Kunihiko Sasaki, Aichi (JP)

(73) Assignees: National Institute of Information and Communications Technology Incorporated Administrative Agency, Tokyo (JP); Denso Corporation, Aichi (JP)

(*) Notice: Subject to any disclaimer, the term of this patent is extended or adjusted under 35 U.S.C. 154(b) by 766 days.

(21) Appl. No.: 10/092,697

(22) Filed: Mar. 6, 2002

(65) Prior Publication Data

US 2002/0126774 A1 Sep. 12, 2002

(30) Foreign Application Priority Data

Mar. 6, 2001 (JP) ........................................ 2001-062112

(51) Int. Cl.[7] .............................. H03D 1/00; H04L 27/06
(52) U.S. Cl. ........................ 375/340; 375/260; 370/206; 370/212
(58) Field of Search ................................. 375/340, 346, 375/259, 260; 370/204, 206, 212, 213, 215

(56) References Cited

U.S. PATENT DOCUMENTS

| | | | | |
|---|---|---|---|---|
| 4,713,829 A | * | 12/1987 | Eyuboglu | ............... 375/259 |
| 5,652,541 A | * | 7/1997 | Yang et al. | ............... 329/300 |
| 5,717,723 A | * | 2/1998 | Hulbert | ............... 375/340 |
| 6,081,559 A | * | 6/2000 | Leclerc et al. | ............... 375/326 |
| 6,137,843 A | * | 10/2000 | Chennakeshu et al. | ...... 375/340 |
| 6,668,014 B1 | * | 12/2003 | Endres et al. | ............... 375/232 |
| 6,895,060 B2 | * | 5/2005 | Kroeger et al. | ............... 375/340 |

FOREIGN PATENT DOCUMENTS

| | | |
|---|---|---|
| JP | 10-215235 | 8/1998 |
| JP | 11-163822 | 6/1999 |

* cited by examiner

Primary Examiner—Jay K. Patel
Assistant Examiner—Qutub Ghulamali
(74) Attorney, Agent, or Firm—Mitchell P. Brook; Luce, Forward, Hamilton & Scripps LLP

(57) ABSTRACT

A channel evaluator acquires a change predicted value from a known symbol, and a compensator compensates for a first symbol using the change predicted value. A demodulator restores a portion corresponding to this symbol with another subcarrier. A replica generator acquires a transmission replica of the restored symbol. The channel evaluator performs complex division on the replica with the symbol to acquire an amplitude phase ratio. A detector compares the amplitude phase ratio with an amplitude phase ratio acquired immediately previously. In case where an elimination condition is satisfied, the detector disregards the amplitude phase ratio acquired currently and uses an immediately previous value instead, an averaging unit averages amplitude phase ratios to acquire a next change predicted value, and the compensator compensates for a next symbol using the change predicted value. Hereinafter, the sequence of processes is repeated.

26 Claims, 11 Drawing Sheets

RECEIVING APPARATUS, RECEIVING METHOD, PROGRAM AND INFORMATION RECORDING MEDIUM

BACKGROUND OF THE INVENTION

1. Field of the Invention

The present invention relates to a receiving apparatus and a receiving method which are suitable for adaptively predicting the transmission characteristic in case where OFDM (Orthogonal Frequency Division Multiplex) packet communication is executed under a fast mobile environment, a program which achieves the receiving apparatus and method, and a computer readable information recording medium which has the program recorded thereon.

2. Description of the Related Art

Recently, the quick spreading of the Internet or the like is contributing to the construction of environments under which a vast amount of information, such as multimedia information, can exchanged anytime and anywhere. Demands for mobile computing to ensure transmission of such a vast amount of information under a mobile environment using portable telephones and PHS (Personal Handyphone Systems) as well as via cable networks.

In this respect, studies are being made on broad-band wireless systems which stand comparison with cable networks and can transmit a large amount of multimedia information. Efforts are being made to realize the standardization of broad-band communication, such as IEEE 802.11a, ETSI-BRAN and ARIB-MMAC, and wireless systems which use the 5 GHz band are actively studied. Those systems employ the OFDM transmission system, one of multi-carrier transmission systems, and have achieved a transmission rate of several tens of Mbps.

In the OFDM transmission system, a sender performs serial-parallel conversion on a signal to be transmitted, performs inverse fast Fourier transformation (IFFT) on the converted signal and then performs parallel-serial conversion on the resultant signal before transmission. A receiver side performs serial-parallel conversion on the transmitted signal, performs fast Fourier transformation (FFT) on the converted signal and then performs parallel-serial conversion on the resultant signal to acquire a transmission signal.

In those systems, the moving speed of each mobile terminal is assumed to be relatively slow, such as a quasi-stationary state or a stationary state.

However, there are increasing demands that users who are moving fast by cars or the like can be provided with wireless systems having a similar transmission capability. To realize an ITS (Intelligent Transport Systems), particularly, the realization of such wireless systems is essential.

Direct adaptation of the conventional OFDM packet communication to a mobile environment however cause an amplitude phase variation in a reception signal due to multipath fading. This is originated from a change in transmission characteristic with the movement of the mobile terminal and the non-negligible influence of the Doppler effect.

In case of using the impulse response, various schemes have been proposed so far to compensate for reception signals by, for example, predicting the transmission characteristic by averaging the time series of impulse responses along the time axis for each sub-carrier (carrier frequency) of the OFDM transmission or obtaining a weighted mean using a forget coefficient.

It is however known that those schemes may have a difficulty in adequately predicting the transmission characteristic when the Doppler frequency is high at a specific sub-carrier which has been affected by the frequency selectivity fading and the signal amplitude phase varies significantly.

SUMMARY OF THE INVENTION

Accordingly, it is an object of the invention to provide a receiving apparatus and a receiving method which are suitable for adaptively predicting the transmission characteristic in case where OFDM packet communication is executed under a fast mobile environment, a program which achieves the receiving apparatus and method, and a computer readable information recording medium which has the program recorded thereon.

While the invention is suitable for OFDM packet communication under a fast mobile environment, the invention can also be adapted to OFDM packet communication under a quasi-stationary environment and a case where other transmission systems are employed.

To achieve the above object, according to the principle of the invention, the following subject matters of the invention are disclosed.

A receiving apparatus according to the first aspect of the invention comprises a reception section, a prediction section, a compensation section, a demodulation section and a modulation section which are constructed in such a way as to perform the following operations.

The reception section receives a result of transmitting a transmission signal obtained by modulating a known signal and a data signal and outputs the result as a reception signal.

The prediction section predicts a transmission characteristic.

The compensation section compensates that portion of the reception signal which corresponds to the data signal and which has not been compensated yet, using a predicted portion of the transmission characteristic, and outputs the compensated portion as a compensated data signal.

The demodulation section demodulates the compensated data signal and outputs the demodulated signal as a demodulated data signal.

The modulation section modulates the demodulated data signal and outputs the modulated signal as a modulated data signal.

The prediction section operates as follows.

First, the prediction section compares that portion of the reception signal which corresponds to the known signal with a result of modulating the known signal and compares that portion of the reception signal which corresponds to the data signal with that portion of the modulated data signal which corresponds to the data signal to acquire a time series of comparison results.

Next, the prediction section replaces a value in the time series of comparison results which satisfies a predetermined exclusion condition with an old value of the time series of comparison results.

Then, the prediction section averages a time series of comparison results resulting from that replacement, and The prediction section then lets a result of that averaging be a predicted transmission characteristic.

In the receiving apparatus of the invention, the prediction section can be constructed in such a way as to operate as follows.

First, the prediction section acquires a time series of amplitude phase ratios $G^{-1}(1)$, $G^{-1}(2)$, $G^{-1}(3)$, ... from following results (x) and (y):

(x) a result of performing complex division on a result of modulating the known signal with that portion of the reception signal which corresponds to the known signal, and (y) a result of performing complex division on a that portion of the modulated signal which corresponds to the data signal with that portion of the reception signal which corresponds to the data signal.

Next, the prediction section replaces an n-th value $G^{-1}(n)$ in the time series of amplitude phase ratios with a previous value $G^{-1}(n-q)$ ($1 \leq q < n$; q being an integer) to the value $G^{-1}(n)$ when $$|G^{-1}(n)|/|G^{-1}(n-p)| > \lambda$$

where $G^{-1}(n-p)$ ($1 \leq p < n$; p being an integer) is a value previous to the value $G^{-1}(n)$ and $\lambda$ is a predetermined threshold value, is satisfied.

Further, the prediction section acquires a time series of amplitude phase inverse change prediction values $H^{-1}(1)$, $H^{-1}(2)$, $H^{-1}(3)$, ... given that $H^{-1}(n)$ is a average value over a range of the time series of amplitude phase ratios $$G^{-1}(n-N+1), \ldots, G^{-1}(n-2), G^{-1}(n-1), G^{-1}(n)$$

$$(G^{-1}(m)=G^{-1}(1) \text{ when } m \leq 0)$$

where n is an n-th value in the time series of amplitude phase ratios and N is a predetermined positive integer.

Then, the prediction section lets the time series of amplitude phase inverse change prediction values $H^{-1}(1)$, $H^{-1}(2)$, $H^{-1}(3)$, ... be a predicted transmission characteristic.

A receiving apparatus according to the second aspect of the invention comprises a reception section, a separation section, a prediction section, a compensation section, a restoration section and a modulation section which are constructed in such a way as to perform the following operations.

The reception section receives a result of transmitting a transmission signal obtained by modulating a known signal and a data signal and outputs the result as a reception signal by a multi-carrier transmission system using carrier frequencies orthogonal to each other.

The separation section separates the reception signal to reception signals for respective carrier frequencies by serial-parallel conversion and fast Fourier transform and outputs the separated reception signals as separated signals.

The prediction section predicts a transmission characteristic for each of the carrier frequencies.

The compensation section compensates that portion of each of the reception signals which corresponds to the data signal and which has not been compensated yet, using a predicted portion of the transmission characteristic, and outputs those compensated portions as compensated data signals.

The restoration section performs serial-parallel conversion on the compensated data signals and outputs resultant signals as a restored data signal.

The modulation section modulates the restored data signal and outputs the modulated signal as a modulated data signal.

For that separated signal which is included in the separated signals and corresponds to each of the carrier frequencies, the prediction section operates as follows:

First, the prediction section compares that portion of the separated signal which corresponds to the known signal with a result of modulating the known signal and compares that portion of the separated signal which corresponds to the data signal with that portion of the modulated data signal which corresponds to the data signal to acquire a time series of comparison results.

Next, the prediction section replaces a value in the time series of comparison results which satisfies a predetermined exclusion condition with an old value of the time series of comparison results.

Then, the prediction section averages a time series of comparison results resulting from that replacement.

The prediction section then lets a result of that averaging be a predicted transmission characteristic.

In the receiving apparatus of the invention, for that separated signal which is included in the separated signals and corresponds to each of the carrier frequencies, the prediction section can be constructed in such a way as to operate as follows.

First, the prediction section acquires a time series of amplitude phase ratios $G^{-1}(f, 1)$, $G^{-1}(f, 2)$, $G^{-1}(f, 3)$, ... from following results (x) and (y):

(x) a result of performing complex division on a result of modulating the known signal with that portion of the separated signal which corresponds to the known signal, and (y) a result of performing complex division on a that portion of the modulated signal which corresponds to the data signal with that portion of the separated signal which corresponds to the data signal.

Next, the prediction section replaces an n-th value $G^{-1}(f, n)$ in the time series of amplitude phase ratios with a previous value $G^{-1}(f, n-q)$ ($1 \leq q < n$; q being an integer) to the value $G^{-1}(f, n)$ when $$|G^{-1}(f, n)|/|G^{-1}(f, n-p)| > \lambda$$

where $G^{-1}(f, n-p)$ ($1 \leq p < n$; p being an integer) is a value previous to the value $G^{-1}(f, n)$ and $\lambda$ is a predetermined threshold value, is satisfied.

Further, the prediction section acquires a time series of amplitude phase inverse change prediction values $H^{-1}(, 1)$, $H^{-1}(f, 2)$, $H^{-1}(f, 3)$, ... given that $H^{-1}(f, n)$ is an average value over a range of the time series of amplitude phase ratios $$G^{-1}(f, n-N+1), \ldots, G^{-1}(f, n-2), G^{-1}(f, n-1), G^{-1}(f, n)$$

$$(G^{-1}(f, m)=G^{-1}(f, 1) \text{ when } m \leq 0)$$

where n is an n-th value in the time series of amplitude phase ratios and N is a predetermined positive integer.

Then, the prediction section lets the time series of amplitude phase inverse change prediction values $H^{-1}(f, 1)$, $H^{-1}(f, 2)$, $H^{-1}(f, 3)$, ... be a predicted transmission characteristic.

A receiving method according to the third aspect of the invention comprises a reception step, a prediction step, a compensation step, a demodulation step and a modulation step which are designed in such a way as to perform the following processes.

The reception step receives a result of transmitting a transmission signal obtained by modulating a known signal and a data signal and outputs the result as a reception signal.

The prediction step predicts a transmission characteristic.

The compensation step compensates that portion of the reception signal which corresponds to the data signal and which has not been compensated yet, using a predicted portion of the transmission characteristic, and outputs the compensated portion as a compensated data signal.

The demodulation step demodulates the compensated data signal and outputs the demodulated signal as a demodulated data signal.

The modulation step modulates the demodulated data signal and outputs the modulated signal as a modulated data signal.

The prediction step performs the following processes.

First, the prediction step compares that portion of the reception signal which corresponds to the known signal with a result of modulating the known signal and compares that portion of the reception signal which corresponds to the data signal with that portion of the modulated data signal which corresponds to the data signal to acquire a time series of comparison results.

Next, the prediction step replaces a value in the time series of comparison results which satisfies a predetermined exclusion condition with an old value of the time series of comparison results.

Further, the prediction step averages a time series of comparison results resulting from that replacement.

Then, the prediction step lets a result of that averaging be a predicted transmission characteristic.

In the receiving method, the prediction step may perform the following processes.

First, the prediction step acquires a time series of amplitude phase ratios $G^{-1}(1), G^{-1}(2), G^{-1}(3), \ldots$ from following results (x) and (y):

(x) a result of performing complex division on a result of modulating the known signal with that portion of the reception signal which corresponds to the known signal, and (y) a result of performing complex division on a that portion of the modulated signal which corresponds to the data signal with that portion of the reception signal which corresponds to the data signal.

Next, the prediction step replaces an n-th value $G^{-1}(n)$ in the time series of amplitude phase ratios with a previous value $G^{-1}(n-q)$ ($1 \leq q < n$; q being an integer) to the value $G^{-1}(n)$ when $$|G^{-1}(n)|/|G^{-1}(n-p)| > \lambda$$

where $G^{-1}(n-p)$ ($1 \leq p < n$; p being an integer) is a value previous to the value $G^{-1}(n)$ and $\lambda$ is a predetermined threshold value, is satisfied.

Then, the prediction step acquires a time series of amplitude phase inverse change prediction values $H^{-1}(1), H^{-1}(2), H^{-1}(3), \ldots$ given that $H^{-1}(n)$ is an average value over a range of the time series of amplitude phase ratios $$G^{-1}(n-N+1), \ldots, G^{-1}(n-2), G^{-1}(n-1), G^{-1}(n)$$

$$(G^{-1}(m) = G^{-1}(1) \text{ when } m \leq 0)$$

where n is an n-th value in the time series of amplitude phase ratios and N is a predetermined positive integer.

Then, the prediction step lets the time series of amplitude phase inverse change prediction values $H^{-1}(1), H^{-1}(2), H^{-1}(3), \ldots$ be a predicted transmission characteristic.

A receiving method according to the fourth aspect of the invention comprises a reception step, a separation step, a prediction step, a compensation step, a restoration step and a modulation step which are designed in such a way as to perform the following processes.

The reception step receives a result of transmitting a transmission signal obtained by modulating a known signal and a data signal and outputs the result as a reception signal by a multi-carrier transmission system using carrier frequencies orthogonal to each other.

The separation step separates the reception signal to reception signals for respective carrier frequencies by serial-parallel conversion and fast Fourier transform and outputs the separated reception signals as separated signals.

The prediction step predicts a transmission characteristic for each of the carrier frequencies.

The compensation step compensates that portion of each of the reception signals which corresponds to the data signal and which has not been compensated yet, using a predicted portion of the transmission characteristic, and outputs those compensated portions as compensated data signals.

The restoration step performs serial-parallel conversion on the compensated data signals and outputs resultant signals as a restored data signal.

The modulation step modulates the restored data signal and outputs the modulated signal as a modulated data signal, For that separated signal which is included in the separated signals and corresponds to each of the carrier frequencies, the prediction step performs the following processes.

First, the prediction step compares that portion of the separated signal which corresponds to the known signal with a result of modulating the known signal and compares that portion of the separated signal which corresponds to the data signal with that portion of the modulated data signal which corresponds to the data signal to acquire a time series of comparison results.

Next, the prediction step replaces a value in the time series of comparison results which satisfies a predetermined exclusion condition with an old value of the time series of comparison results.

Then, the prediction step averages a time series of comparison results resulting from that replacement.

The prediction step then lets a result of that averaging be a predicted transmission characteristic.

In the receiving method of the invention, for that separated signal which is included in the separated signals and corresponds to each of the carrier frequencies, the prediction step can be designed in such a way as to perform the following processes.

First, the prediction step acquires a time series of amplitude phase ratios $G^{-1}(f, 1), G^{-1}(f, 2), G^{-1}(f, 3), \ldots$ from following results (x) and (y):

(x) a result of performing complex division on a result of modulating the known signal with that portion of the separated signal which corresponds to the known signal, and (y) a result of performing complex division on a that portion of the modulated signal which corresponds to the data signal with that portion of the separated signal which corresponds to the data signal.

Next, the prediction step replaces an n-th value $G^{-1}(f, n)$ in the time series of amplitude phase ratios with a previous value $G^{-1}(f, n-q)$ ($1 \leq q < n$; q being an integer) to the value $G-1(f, n)$ when $$|G^{-1}(f, n)|/|G^{-1}(f, n-p)| > \lambda$$

where $G^{-1}(f, n-p)$ ($1 \leq p < n$; p being an integer) is a value previous to the value $G^{-1}(f, n)$ and $\lambda$ is a predetermined threshold value, is satisfied.

Then, the prediction step acquires a time series of amplitude phase inverse change prediction values $H^{-1}(f, 1), H^{-1}(f, 2), H^{-1}(f, 3), \ldots$ given that $H^{-1}(f, n)$ is an average value over a range of the time series of amplitude phase ratios $$G^{-1}(f, n-N+1), \ldots, G^{-1}(f, n-2), G^{-1}(f, n-1), G^{-1}(f, n)$$

$$(G^{-1}(f, m) = G^{-1}(f, 1) \text{ when } m \leq 0)$$

where n is an n-th value in the time series of amplitude phase ratios and N is a predetermined positive integer.

The prediction step then lets the time series of amplitude phase inverse change prediction values $H^{-1}(f, 1), H^{-1}(f, 2), H^{-1}(f, 3), \ldots$ be a predicted transmission characteristic.

The prediction section in the receiving apparatus of the invention or the prediction step in the receiving method of the invention can be designed in such a way as to average the time series of comparison results by using an old value of a time series of the transmission characteristic as a value of a time series of the transmission characteristic which corresponds to that value of the time series of comparison results which does not satisfy the exclusion condition.

The prediction section in the receiving apparatus of the invention or the prediction step in the receiving method of the invention can be designed in such a way as to let $$(1-t+t\mu)G^{-1}(n-1)+t(1-\mu)G^{-1}(n)$$

be $H^{-1}(n)$ by using a predetermined forget coefficient $\mu$ and a value $v$ defined by a following equation $$v=|G^{-1}(n)|/|G^{-1}(n-p)|,$$

and a weight t defined by a following equation with respect to predetermined constants a and b (b>a>0)

$$t=-av+b(v \leq b/a);$$

$$t=0(v>b/a)$$

in place of the average value over the range of the time series of amplitude phase ratios.

The prediction section in the receiving apparatus of the invention or the prediction step in the receiving method of the invention may be designed in such a way as to let $$((N-t)/(N(N-1)))\Sigma_{i=n-N+1}{}^{n-1}G^{-1}(i)+(t/N)G^{-1}(n)$$

be $H^{-1}(n)$ by using a value $v$ defined by a following equation $$v=|G^{-1}(n)|/|G^{-1}(n-p)|,$$

and a weight t defined by a following equation with respect to predetermined constants a and b (b>a>0)

$$t=-av+b(v \leq b/a);$$

$$t=0(v>b/a)$$

in place of the average value over the range of the time series of amplitude phase ratios.

The prediction section in the receiving apparatus of the invention or the prediction step in the receiving method of the invention can be designed in such a way as to let $H^{-1}(n-q)$ be $H^{-1}(n)$ in place of the average value over the range of the time series of amplitude phase ratios when the exclusion condition is satisfied for an integer n.

The prediction section in the receiving apparatus of the invention or the prediction step in the receiving method of the invention may be designed in such a way as to let $$(1-t+t\mu)G^{-1}(f, n-1)+t(1-\mu)G^{-1}(f, n)$$

be $H^{-1}(f, n)$ by using a predetermined forget coefficient $\mu$ and a value $v$ defined by a following equation $$v=|G^{-1}(f, n)|/|G^{-1}(f, n-p)|,$$

and a weight t defined by a following equation with respect to predetermined constants a and b (b>a>0)

$$t=-av+b(v \leq b/a);$$

$$t=0(v>b/a)$$

in place of the average value over the range of the time series of amplitude phase ratios.

The prediction section in the receiving apparatus of the invention or the prediction step in the receiving method of the invention may be designed in such a way as to let $$((N-t)/(N(N-1)))\Sigma_{i=n-N+1}{}^{n-1}G^{-1}(f, i)+(t/N)G^{-1}(f, n)$$

be $H^{-1}(f, n)$ by using a value $v$ defined by a following equation $$v=|G^{-1}(f, n)|/|G^{-1}(f, n-p)|,$$

and a weight t defined by a following equation with respect to predetermined constants a and b (b>a>0)

$$t=-av+b(v \leq b/a);$$

$$t=0(v>b/a)$$

in place of the average value over the range of the time series of amplitude phase ratios.

The prediction section in the receiving apparatus of the invention or the prediction step in the receiving method of the invention can be designed in such a way as to let $H^{-1}(f, n-1)$ be $H^{-1}(f, n)$ in place of the average value over the range of the time series of amplitude phase ratios when the exclusion condition is satisfied for an integer n.

A computer readable information recording medium according to the fifth aspect of the invention is designed in such a way as to record a program for allowing a computer to function as the above-described receiving apparatus or the above-described receiving method.

The information recording medium may include one of a compact disk, a floppy disk, a hard disk, a magneto-optical disk, a digital video disk, a magnetic tape and a semiconductor memory.

As the program of the invention is executed on an information processing apparatus (general-purpose computer, game machine, portable information terminal, mobile telephone, DSP (Digital Signal Processor), FPGA (Field Programmable Gate Array) or the like which is equipped with a memory unit, a computing unit and an output unit, the above-described receiving apparatus or the above-described receiving method can be realized.

An information recording media on which the program of the invention is recorded may be distributed and sold independently of such information processing apparatuses.

DETAILED DESCRIPTION OF THE PREFERRED EMBODIMENTS

A preferred embodiment of the invention will be described below with reference to the accompanying drawings. The embodiment to be discussed below will be given as illustrative and does not restrict the scope of the invention. Therefore, it should be apparent to those skilled in the art to employ embodiments which has each or every element of the embodiment replaced with an equivalent element the invention, but such embodiments are also included in the scope of the invention.

Although the following description will describe OFDM packet communication as an example for easier understanding of the invention, the method of the invention can adapted to other communication systems as well, and such embodiments are included in the scope of the invention too. It is to be noted that the I channel and Q channel may be shown in two different lines or a single line, as needed, in the accompanying drawings.

(Embodiment)

Figure 1:
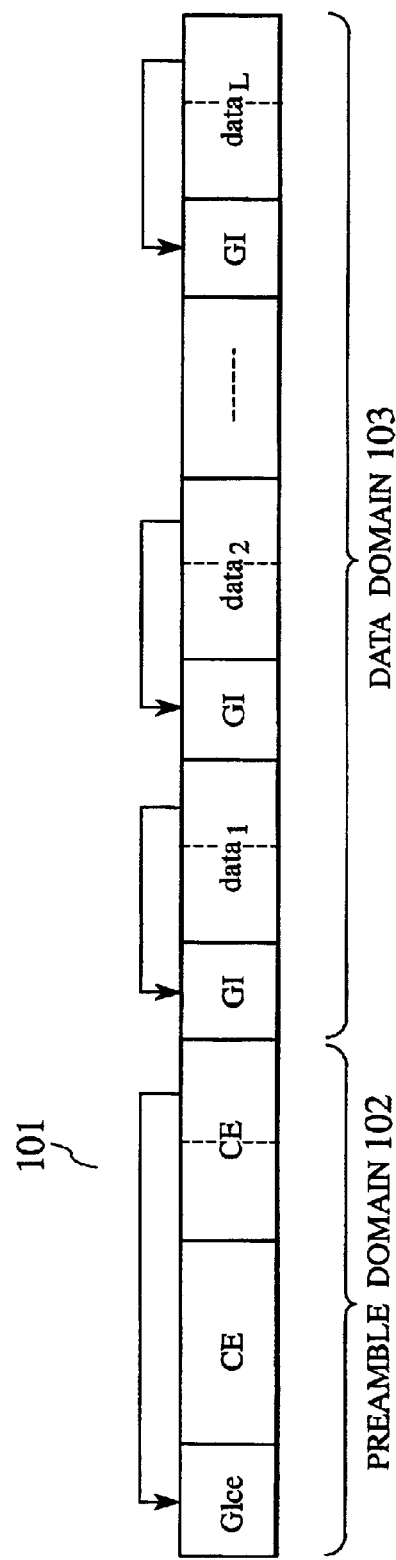
FIG. 1 is an exemplary diagram showing the format of a frame including a known signal and a data signal which are used in one embodiment of the invention.

FIG. 1 shows the frame format of an OFDM packet which is used in one embodiment of the invention. The format will be discussed below referring to this diagram.

A frame (burst) 101 comprises a preamble domain 102 and a data domain 103.

The preamble domain 102 includes two known symbols CE and a single guard interval GIce.

The number of the known symbols CE may be set greater. In case where there are a plurality of known symbols CE, the transmission path is predicted by using the average of those reception symbols.

The data domain 103 includes plural pieces of data to be transmitted ($data_1, \ldots, data_L$) and L guard intervals GI for separating those data.

As transmission is possible by using a plurality of modulation systems and coding rates according to the IEEE 802.11a standards, coding is carried out at the coding rate of 1/2 and an OFDM symbol "SIGNAL" modulated with BPSK (Binary Phase-Shift Keying) is placed after CE. By using SIGNAL, a receiver side is informed of the modulation system and the coding rate that have been used in the data domain 103 of the frame 101.

The receiver side corrects the first OFDM symbol (equivalent to SIGNAL) with CE, and determines the modulation system and the coding rate from the results of demodulation of the corrected symbol. This can allow the receiver side to know the modulation system and the coding rate that have been used by the sender side.

The invention can also be adapted to an embodiment that notifies the modulation system and coding rate and such an embodiment is included in the scope of the invention too. For easier understanding of the invention, descriptions on the notification of the modulation system and the use of the information on the receiver side will be omitted, when needed, from the diagrams and the following description.

Figure 2:
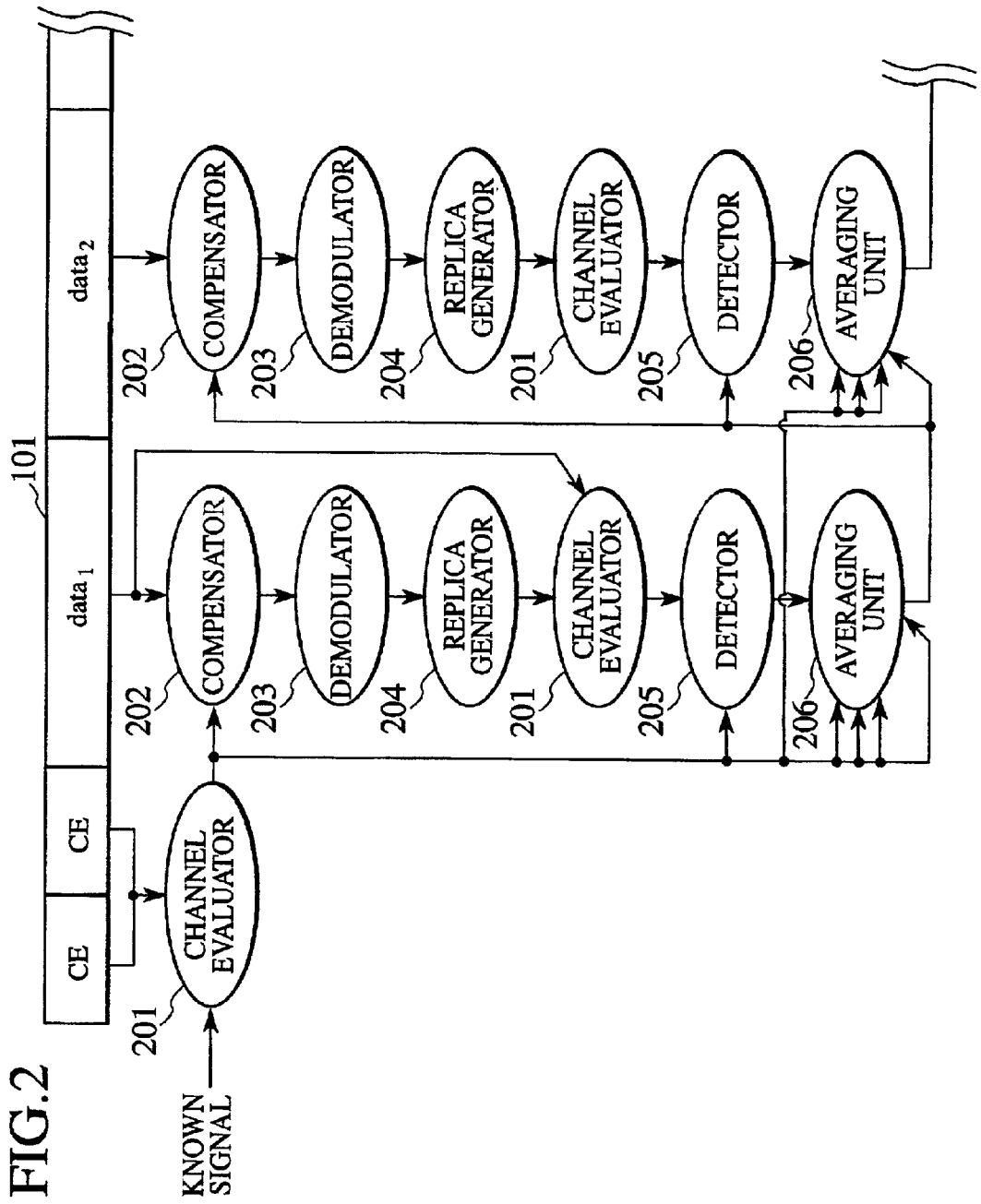
FIG. 2 is an exemplary diagram illustrating a scheme of predicting the value of an amplitude phase inverse change in a receiving apparatus according to one embodiment of the invention.

FIG. 2 is an exemplary diagram illustrating how the receiving apparatus according to the embodiment operates in case where it receives the frame format. The operation will be discussed below referring to FIG. 2.

Although the frame 101 is shown on the top portion of FIG. 2, the guard intervals GIce and GI are not illustrated for easier understanding of the operation. Let us consider a k-th sub-carrier $f_k$ in the OFDM packet communication.

First, a channel evaluator 201 of the receiving apparatus acquires an amplitude phase ratio $G^{-1}(f_k, 1)$ at that time from two known symbol of the preamble domain 102 of the frame 101 of the packet. An amplitude phase inverse change prediction value is $H^{-1}(f_k, 1) = G^{-1}(f_k, 1)$.

Next, a compensator 202 compensates for a symbol $data_1$ of the sub-carrier after FFT using the amplitude phase inverse change prediction value is $H^{-1}(f_k, 1)$.

Further, a demodulator 203 executes demodulation (restoration) on the sub-carrier together with the other sub-carriers and acquires that portion of the transmitted data which corresponds to $data_1$ as an output signal.

Next, a replica generator 204 modulates the restored $data_1$ in the same way as done in a transmitting apparatus, thus yielding a replica of the transmitted symbol before IFFT.

In case where SIGNAL is used in the frame 101, the channel evaluator 201 acquires the modulation system and the coding rate (called "RATE") that have been used on the sender side from the first OFDM symbol which has been corrected and compensated with CE. In this case, the replica generator 204 acquires RATE and acquires a replica of the transmitted symbol in that modulation system.

Further, the channel evaluator 201 performs complex division on the replica of the transmitted symbol with the symbol $data_1$ after FFT to thereby acquire an amplitude phase ratio $G^{31\ 1}(f_k, 2)$.

The following description will be given according to the description method of the mathematical induction for a positive integer n.

After an amplitude phase ratio $G^{-1}(f_k, n)$ is acquired, a detector 205 compares the ratio with an amplitude phase ratio $G^{-1}(f_k, n-1)$ obtained just previously and checks if the following condition is satisfied. In the condition, λ is a predetermined constant.

$$|G^{-1}(f, n)|/|G^{-1}(f, n-p)| > \lambda$$

The case where the condition is met is that the amplitude phase ratio in the sub-carrier is deteriorated instantaneously and should not be used in compensation. When the condition is met, therefore, $G^{-1}(f_k, n)$ obtained currently is discarded and the immediately previous value $G^{-1}(f_k, n-1)$ is used as the value of $G^{-1}(f_k, n)$ instead.

Further, an averaging unit 206 considers an integer m equal to or less than zero as $G^{-1}(f_k, m) = G^{-1}(f_k, 1)$ and sets an average of N amplitude phase ratios $$G^{-1}(f_k, n-N+1), \ldots, G^{-1}(f_k, n-2), G^{-1}(f_k, n-1), G^{-1}(f_k, n)$$

to an amplitude phase inverse change prediction value $H^{-1}(f_k, 1)$. That is, $$H^{-1}(f_k, n) = (1/N) \times \Sigma_{i=n-N+1}^{n} G^{-1}(f_k, i).$$

Then, the compensator 202 compensates for a symbol $data_n$ of the sub-carrier after FFT using the amplitude phase inverse change prediction value is $H^{-1}(f_k, n)$.

Further, the demodulator 203 executes demodulation (restoration) on the sub-carrier together with the other sub-carriers and acquires that portion of the transmitted data which corresponds to data$_n$ as an output signal.

Next, the replica generator 204 modulates the restored data$_n$ in the same way as done in the transmitting apparatus, thus yielding a replica of the transmitted symbol before IFFT.

Then, the channel evaluator 201 performs complex division on the replica of the transmitted symbol with the symbol data$_n$ after FFT to thereby acquire an amplitude phase ratio $G^{-1}(f_k, n+1)$.

The sequence of processes will be repeated until all the data data$_1$, ..., data$_L$ are restored.

In the above-described manner, the present method can adaptively predict an amplitude phase inverse change prediction value and adequately perform signal compensation even with respect to any sub-channel which is deteriorated instantaneously under a fast fading environment.

In the foregoing description, n indicates the position of each symbol. That is, an amplitude phase inverse change prediction value is predicted symbol by symbol. But, the method that suppresses power consumption can be employed by predicting a plurality of symbols, and such an embodiment is also included in the scope of the invention.
(Transmitting Apparatus)

Figure 3:
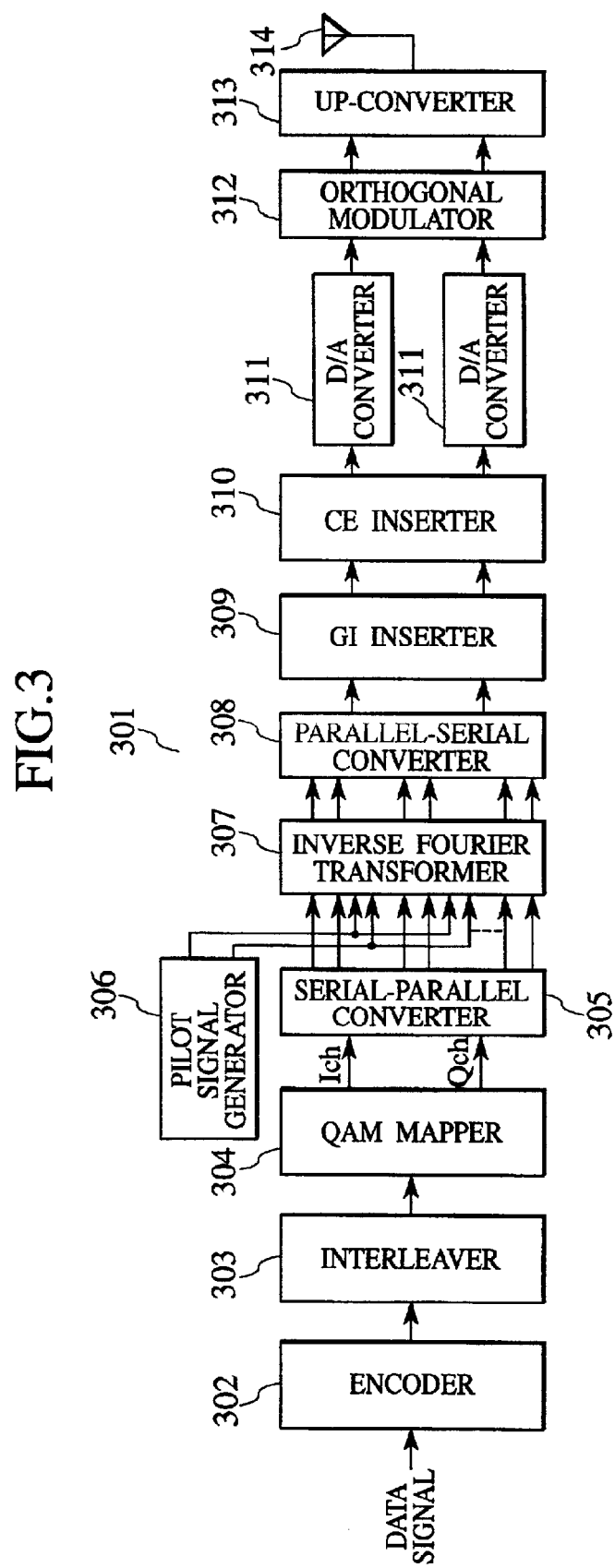
FIG. 3 is an exemplary diagram showing the schematic structure of a transmitting apparatus which is paired with the receiving apparatus according to the embodiment of the invention.

First, a description will be given of a transmitting apparatus which is paired with the receiving apparatus according to the embodiment. FIG. 3 is an exemplary diagram showing the schematic structure of the transmitting apparatus. Although the illustrated transmitting apparatus corresponds to those recommended in IEEE 802.11a and ARIB-MMAC, transmitting apparatuses with other various structures can also be used in pairs with the receiving apparatus of the invention.

A transmitting apparatus 301 performs convolution encoding on input data signals accepted in the unit of a packet by an encoder 302.

The encoded signals are interleaved by an interleaver 303 to reorder the sequence of codes, thereby scrambling the data.

A QAM mapper 304 maps the scrambled data to a 16 QAM value.

A serial-parallel converter 305 performs serial-parallel conversion on the 16 QAM value to a sub-channel signal.

A pilot signal which is generated by a pilot signal generator 306 is also included in the sub-channel signal.

An inverse Fourier transformer 307 performs inverse Fourier transform of those sub-channel signals. A parallel-serial converter 308 performs parallel-serial conversion on the converted signals to OFDM base band signals.

Further, a GI inserter 309 inserts a guard interval to reduce intersymbol interference, thereby improving the resistance with respect to a multipath route.

The guard interval that is used by the transmitting apparatus 301 is a copy of the last portion of each symbol to be transmitted, over a predetermined time, as indicated by the arrows in FIG. 1.

A CE inserter 310 inserts a CE symbol at the head of the burst that is produced by the copying. A D/A converter 311 converts the data signal to an analog signal. An orthogonal modulator 312 performs orthogonal conversion and an up-converter 313 performs frequency conversion on the resultant signal to the RF band. The acquired signal is transmitted from an antenna 314.
(Receiving Apparatus)

A receiving apparatus 401 receives, at its antenna 402, a signal which has been transmitted and influenced by the multipath or the like in the transmission path, selects only the necessary band by means of a base band filter 403 and performs frequency conversion on the resultant signal to yield an OFDM base band signal by means of a down-converter 404.

An orthogonal demodulator 405 separates the OFDM base band signal into an I channel and a Q channel, which are then converted to digital signals by A/D converters 406.

A GI eliminator 407 eliminates the guard interval from each digital signal. A serial-parallel converter 408 performs serial-parallel conversion symbol by symbol. A Fourier transformer 409 performs fast Fourier transform to return each sub-carrier to a QAM value.

As the QAM value obtained here is influenced by the transmission characteristic, the QAM value is not an accurate digital value.

First, a channel evaluator 201 performs complex division on the QAM value of known data 410 with the average value of QAM values which have been acquired in association with the two pieces of know data CE included in the preamble domain 102 and influenced in the transmission, yielding an amplitude phase ratio $G^{-1}(f_k, 1)$.

At this stage, a detector 205 and an averaging unit 206 send the acquired amplitude phase ratio $G^{-1}(f_k, 1)$ directly as the amplitude phase inverse change prediction value $H^{-1}(f_k, 1)$ to a compensator 202 where the first data symbol data$_1$ in the data domain is compensated.

A pilot eliminator 411 eliminates a pilot symbol from the compensated data symbol. A parallel-serial converter 413 performs parallel-serial conversion on the resultant data symbol, and a QAM detector 414 executes a soft detection process. Then, a deinterleaver 415 and an error corrector 416 perform reverse conversion of the interleaving and convolution encoding to restore the transmitted signal.

The restored signal is given to a replica generator 204. In the replica generator 204, an interleaver 303 performs interleaving and a QAM mapper 304 performs mapping to a 16 QAM value, as done in the transmitting apparatus 30. Then, a pilot inserter 412 inserts a pilot signal to generate a replica of the transmitted symbol before inverse Fourier transform.

Thereafter, the channel evaluator 201 performs complex division on the replica and the received symbol after Fourier transform to thereby acquire an amplitude phase ratio $G^{-1}(f_k, n)$. In case where the received symbol is deteriorated, the detector 205 uses the immediately previous value $G^{-1}(f_k, n-1)$ instead of the amplitude phase ratio $G^{-1}(f_k, n)$.

Further, the averaging unit 206 averages the recent N amplitude phase ratios $G^{-1}(f_k, n-N+1), \ldots, G^{-1}(f_k, n-2)$, $G^{-1}(f_k, n-1)$ and $G^{-1}(f_k, n)$ and supplies the average value to the compensator 202 as an amplitude phase inverse change prediction value $H^{-1}(f_k, n)$.

The compensator 202 compensates data$_n$ with the amplitude phase inverse change prediction value $H^{-1}(f_k, n)$.

The sequence of processes will be repeated until the frame ends.

As apparent from the foregoing description, the transmission characteristic is adequately predicted and data is compensated even in OFDM packet communication under a fast mobile environment.

Note that a convolutional encoder may be used as the encoder 302 in the transmitting apparatus 301, and a Viterbi encoder may be used as the encoder 302 in the receiving apparatus 401.
(Experimental Results)

The following will discuss the results of computer-simulated determination of the performance in case where OFDM packet communication is executed by using the method of the invention.

The following are parameters involved.
The modulation system is 16 QAM-OFDM.
The number of sub-carriers is 52 in which there are four pilot signals.
The spacing of sub-carrier frequencies is 0.3125 MHz.
The OFDM bandwidth is 16.5625 MHz.
The size of FFT is 64.
The symbol width is 4 $\mu$s.
The guard interval is 800 ns.
The number of CE symbols in one packet is 2.
The interleave size is 16×12 bits.
The integer N of averaging symbols equals to 8.
Threshold value $\lambda=5$.
The scheme of error correction coding is convolutional code/soft detection Viterbi (R=½, K=7).
The transmission path model is a BRAN model with a delay spread of 150 ns.

Figure 5:
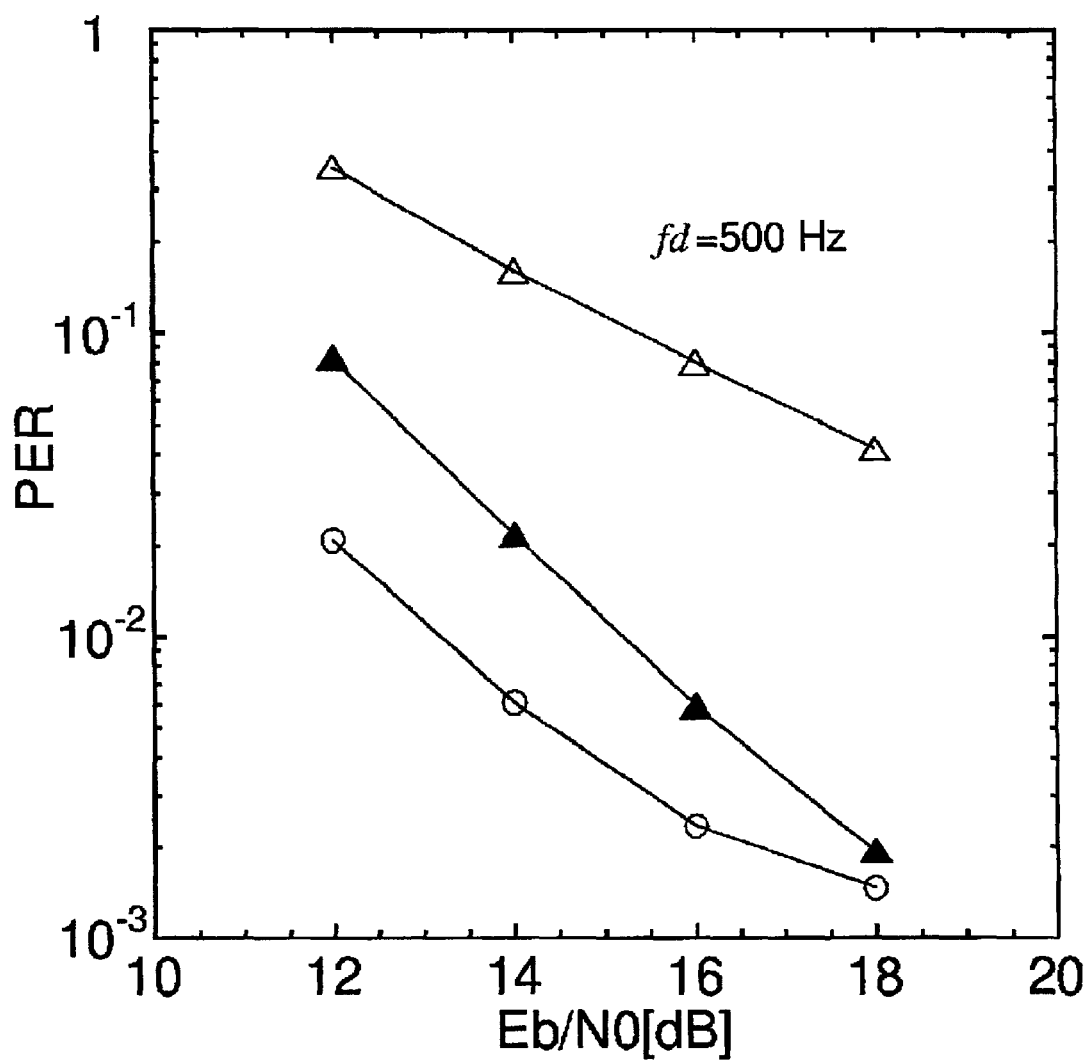
FIG. 5 is a graph illustrating the results of computer-simulated experiments which compare the method of the invention with the method of the related art.

FIG. 5 is a graph illustrating the PER (Packet Error Rate) characteristics in case where the invention is adapted under a fast fading environment. In this case, simulation was conducted with the 5 GHz band used as the frequency band and a maximum Doppler frequency fd set to 500 Hz. This case is equivalent to communication carried out while driving at a velocity of about 100 km/hour.

The diagram shows the characteristic in case where the method of the invention is used when the number of OFDM information symbols in the data portion in a packet is set to 100 (white circles in the diagram), the characteristic in case where only averaging is carried out without using the detector 205 (black triangles in the diagram), and the characteristic in case where amplitude phase variation is compensated only with the CE symbols when the number of OFDM information symbols is set to 4 (white triangles in the diagram).

In case where amplitude phase variation is compensated with the CE symbols alone when the number of OFDM information symbols is set to 4, the packet length is short, making a fading variation in the packet small, so that the characteristic demonstrated appears fine. As the fading variation becomes faster, the prediction precision of the CE symbol gets lower, so that an error floor occurs in an area where Eb/N0 is large.

Next, the system that performs only the averaging process can follow up a fading variation better as compared with the compensation system that uses the CE symbols alone. Even if a prediction error is large in the compensation system that uses the CE symbols alone, the amplitude phase inverse change prediction values are treated as a time series, so that transmission can be carried out without causing an error floor. Under a fast fading environment, however, the averaging process reduces the prediction precision, an error with PER of about $10^{-1}$ to $10^{-2}$ occurs when the packet length is 100 symbols.

Finally, when the method of the invention is used, a response to a fading variation is excellent and a deteriorated sub-channel is not used, so that high-precision prediction can be executed. The present method therefore improves the characteristic as compared with the conventional system. Even when the packet length is 100 symbols, for example, an error rate is as low as about $10^{-2}$ to $10^{-3}$.

Apparently, the advantages of the present method has been demonstrated.

Figure 6:
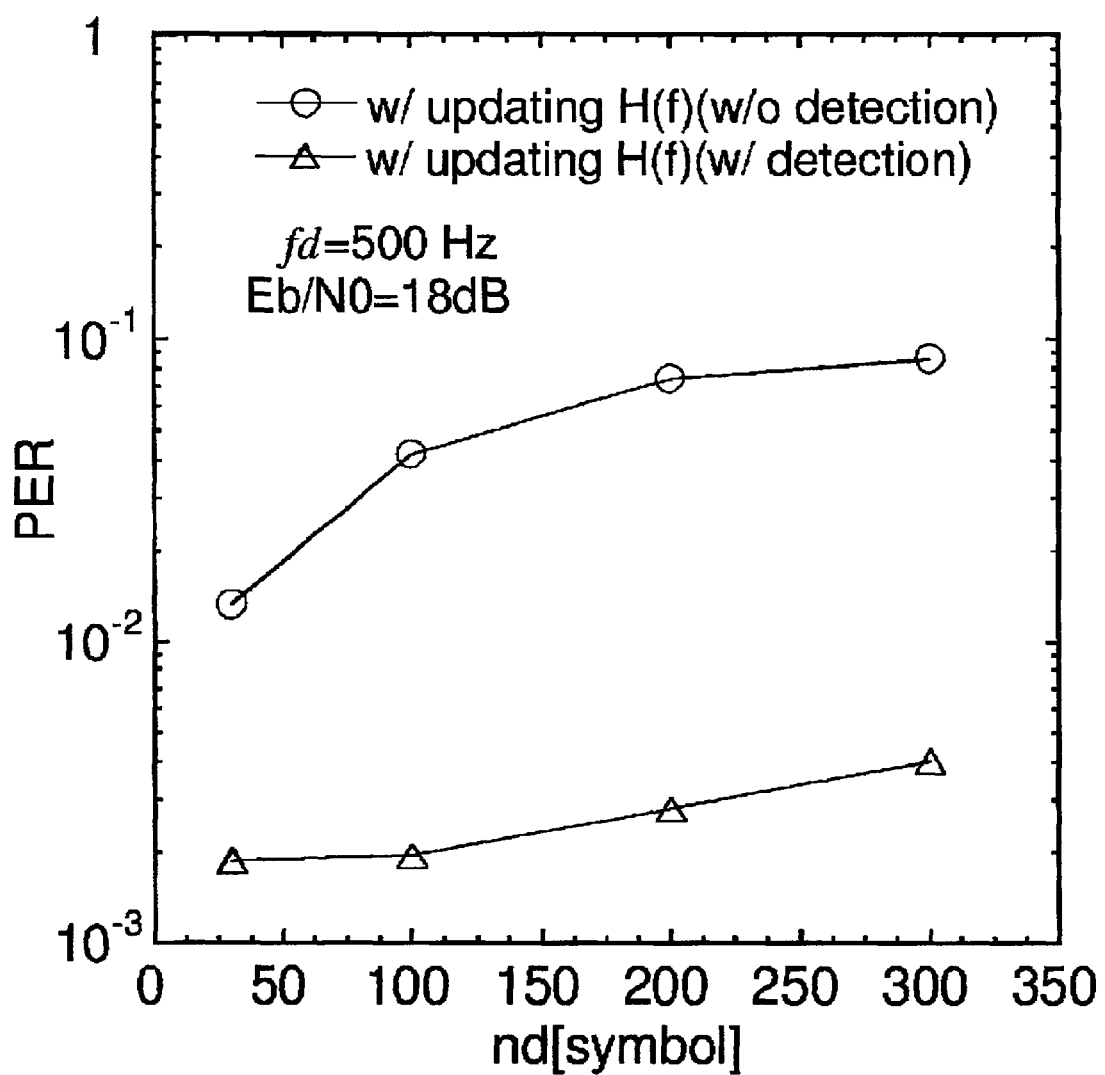
FIG. 6 is a graph illustrating the results of computer-simulated experiments which compare the method of the invention with the method of the related art.

FIG. 6 is a graph illustrating the results of computer-simulated examination of the characteristic in case where the number of OFDM information symbols (packet length), nd, in the data portion in a packet is changed. The following description will be given referring to this diagram.

In case where 16 QAM-QFDM is used with the format defined in IEEE 802.11a, the packet length nd becomes a maximum of about 300 symbols in consideration of parameters or the like received from the MAC layer.

This diagram shows the relationship between the packet length nd and PER with respect to the method of the invention (white triangles) and the method that performs only the averaging process (white circles). The maximum Doppler frequency fd is fixed to 500 Hz and Eb/N0 is fixed to 18 dB.

As the packet length nd becomes larger, PER becomes lower in both methods as illustrated; however, the present method not only has a better characteristic but also shows less deterioration in the characteristic when the packet length becomes larger, as compared with the method that performs only the averaging process.

It is apparent that the present invention has a higher resistance with respect to the packet length than the conventional system.

Figure 7:
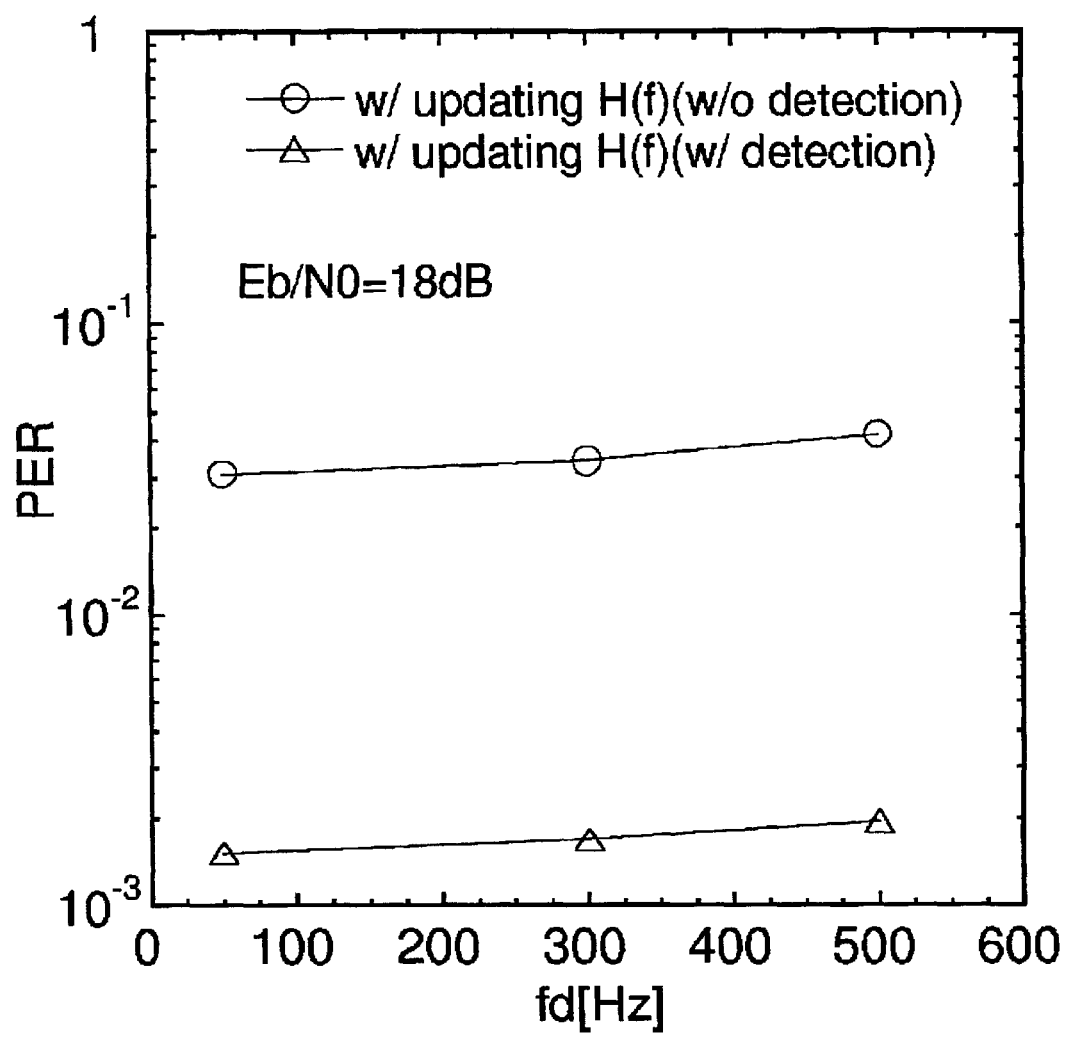
FIG. 7 is a graph illustrating the results of computer-simulated experiments which compare the method of the invention with the method of the related art.

FIG. 7 is a graph illustrating the results of computer-simulated examination of a change in the characteristic with respect to a fading variation. The following description will be given referring to this diagram.

This diagram shows the relationship between the maximum Doppler frequency fd and PER with respect to the method of the invention (white triangles) and the method that performs only the averaging process (white circles). Note that Eb/N0 is fixed to 18 dB and nd is set to 100 symbols.

While the error rate in the method that performs only the averaging process is about $10^{-2}$, the error rate in the present method is considerably lower than that.

In this experiment, the number of symbols N to be averaged is set to a relatively small value of 8 in order to follow up a fast change in fading. The method that performs only the averaging process is susceptible to the influence of a deteriorated sub-channel even under a slow fading environment.

By way of contrast, it is understood that because the system of the present invention eliminates the influence of a deteriorated sub-channel, the characteristic is far better, regardless of the value of fd.

As apparent from the foregoing description, the present method can demonstrate a sufficient effect with respect to fading as compared with the conventional system.

Figure 8:
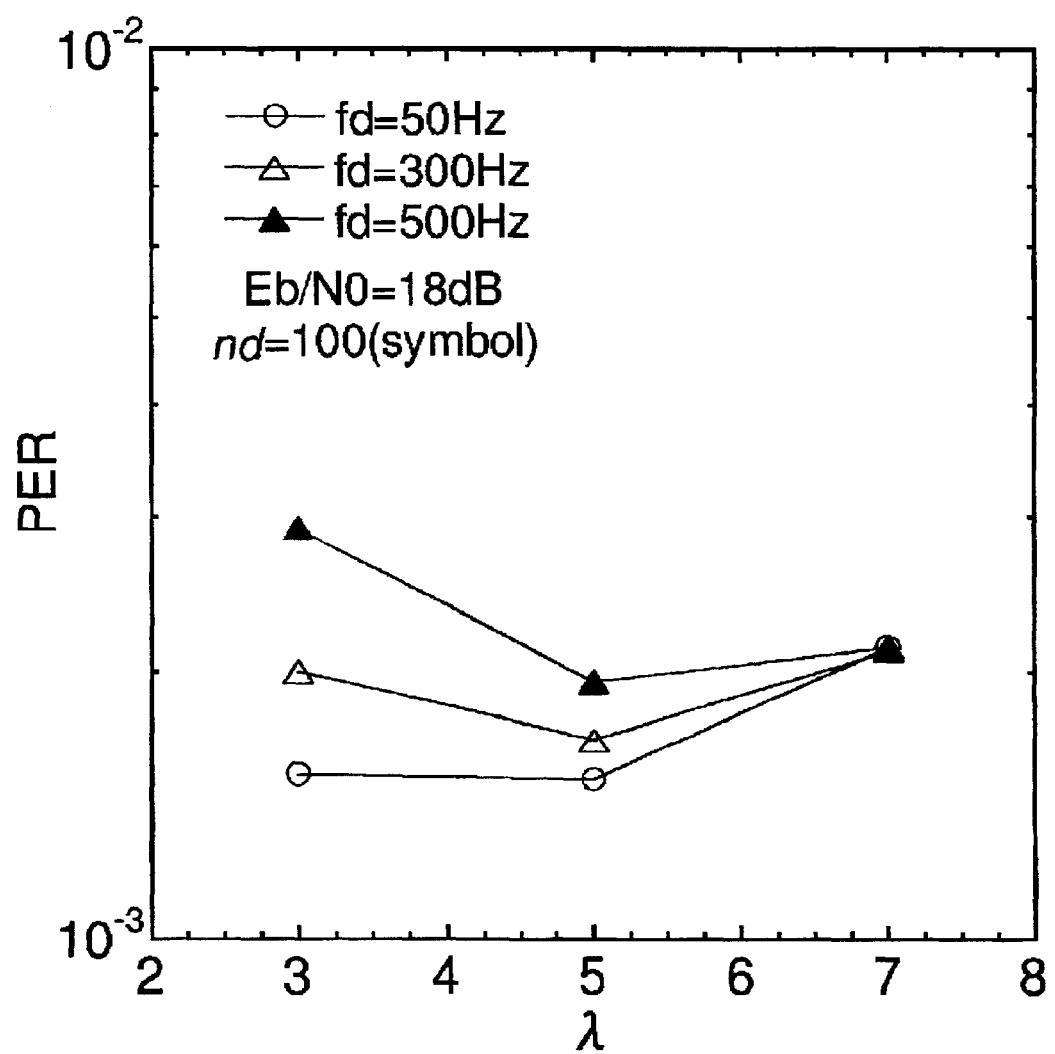
FIG. 8 is a graph showing the results of computer-simulated experiments and illustrating how PER is changed by a threshold value λ according to the method of the invention.

FIG. 8 is a graph illustrating the results of computer-simulated examination of the relationship between $\lambda$ and PER.

This diagram shows the results in cases where the maximum Doppler frequency fd is 50 Hz (white circles), is 300 Hz (white triangles) and is 500 Hz (black triangles). Note that Eb/N0 is fixed to 18 dB and nd is set to 100 symbols.

It is apparent from the diagram that the characteristic is deteriorated due to the fact that as $\lambda$ increases, the frequency of detection of deteriorated sub-channels drops.

As $\lambda$ becomes smaller, on the other hand, a change in fading is mistaken for a deteriorated sub-channel and is eliminated. This makes it difficult to follow up a fading variation, so that the characteristic is apparently deteriorated.

It is understood that for any fd, $\lambda=5$ is the optimal value for the system in the experiment.

(Other Embodiments)

Various schemes as discussed below can be used with respect to the exclusion condition and the averaging process.

The first scheme is to replace an n-th value $G^{-1}(f, n)$ in the time series of amplitude phase ratios with a previous value $G^{-1}$(f, n-q) ($1 \leq q < n$; q being an integer) to the value $G^{-1}$(f, n) by comparing an n-th value $G^{-1}(f_k, n)$ with a previous value $G^{-1}(f_k, n-p)$ ($1 \leq p < n$; p being an integer), not comparing an n-th value in the time series of amplitude phase ratios with an immediately previous value, when $$|G^{-1}(f, n)|/|G^{-1}(f, n-p)| > \lambda$$

where $G^{-1}$(f, n-p) is a value previous to the value $G^{-1}$(f, n) and $\lambda$ is a predetermined threshold value, is satisfied. This embodiment is equivalent to the case of p=q=1.

The second scheme is to let $$(1-t+t\mu)G^{-1}(f, n-1)+t(1-\mu)G^{-1}(f, n)$$

be $H^{-1}$(f, n) by using, not the average value over the range of the time series of amplitude phase ratios, but a predetermined forget coefficient $\mu$ and a value v defined by a following equation $$v=|G^{-1}(f, n)|/|G^{-1}(f, n-p)|,$$

and a weight t defined by a following equation with respect to predetermined constants a and b (b>a>0)

$$t=-av+b(v \leq b/a);$$

$$t=0(v>b/a).$$

The third scheme is to let $$((N-t)/(N(N-1)))\Sigma_{i=n-N+1}^{n-1}G^{-1}(f, i)+(t/N)G^{-1}(f, n)$$

be $H^{-1}$(f, n) by using, not the average value over the range of the time series of amplitude phase ratios, but a value v defined by a following equation $$v=|G^{-1}(f, n)|/|G^{-1}(f, n-p)|,$$

and a weight t defined by a following equation with respect to predetermined constants a and b (b>a>0)

$$t=-av+b(v \leq b/a);$$

$$t=0(v>b/a).$$

In case where a=0.25, b=1.25 and b/a=5 as an equivalent case of $\lambda=5$ at which the packet error rate can be minimized in the aforementioned experiment, for example, t=0 when v=5, so that $$H^{-1}(n)=G^{-1}(n-1).$$

When v=3, t=0.5, so that $$H^{-1}(n)=0.5(1+\mu)G^{-1}(n-1)+0.5(1-\mu)G^{-1}(n).$$

Apparently, there is no influence of $G^{-1}$(n) when v=5, whereas when v=3, averaging is carried out with some influence of $G^{-1}$(n) remaining. That is, t can be said to correspond to the degree of influence of the process of averaging $G^{-1}$(n).

It is desirable to select the constant a and b in such a way that b/a becomes equal to the value of $\lambda$ which can minimize the packet error rate.

As those averaging schemes involve weighting, the schemes have such characteristics that the influence of $G^{-1}$(n) becomes smaller at the time of acquiring $H^{-1}$(n). It is possible to select either mode in accordance with the environment of the transmission path.

In addition, when the exclusion condition is satisfied for an integer n, it is possible to use a scheme of letting $H^{-1}$(f, n-q) itself, not the average value over the range of the time series of amplitude phase ratios, be $H^{-1}$(f, n).

This scheme can reduce the amount of computation when the exclusion condition is met.

Figure 4:
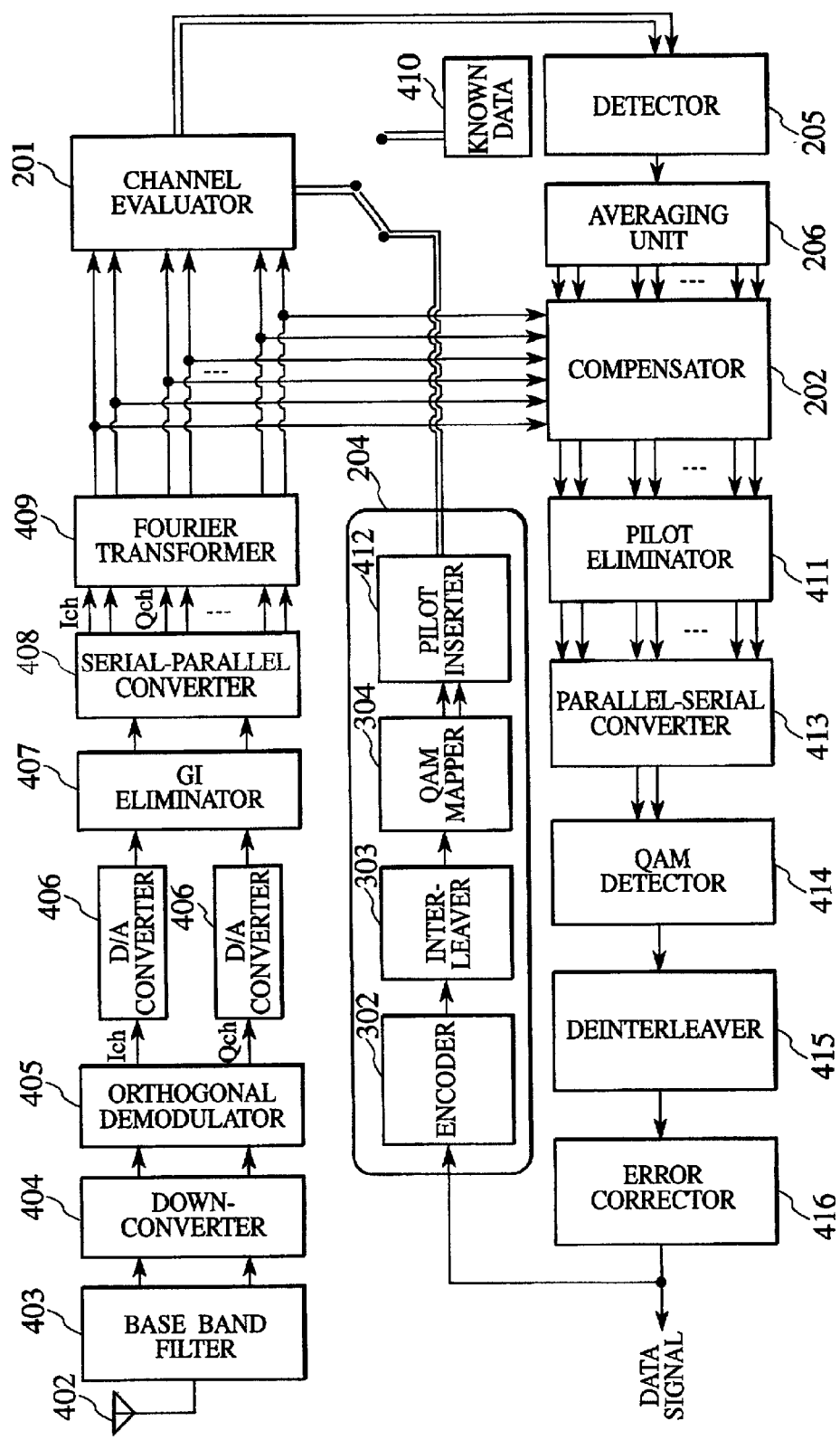
FIG. 4 is an exemplary diagram showing the schematic structure of the receiving apparatus according to the embodiment of the invention.
Figure 9:
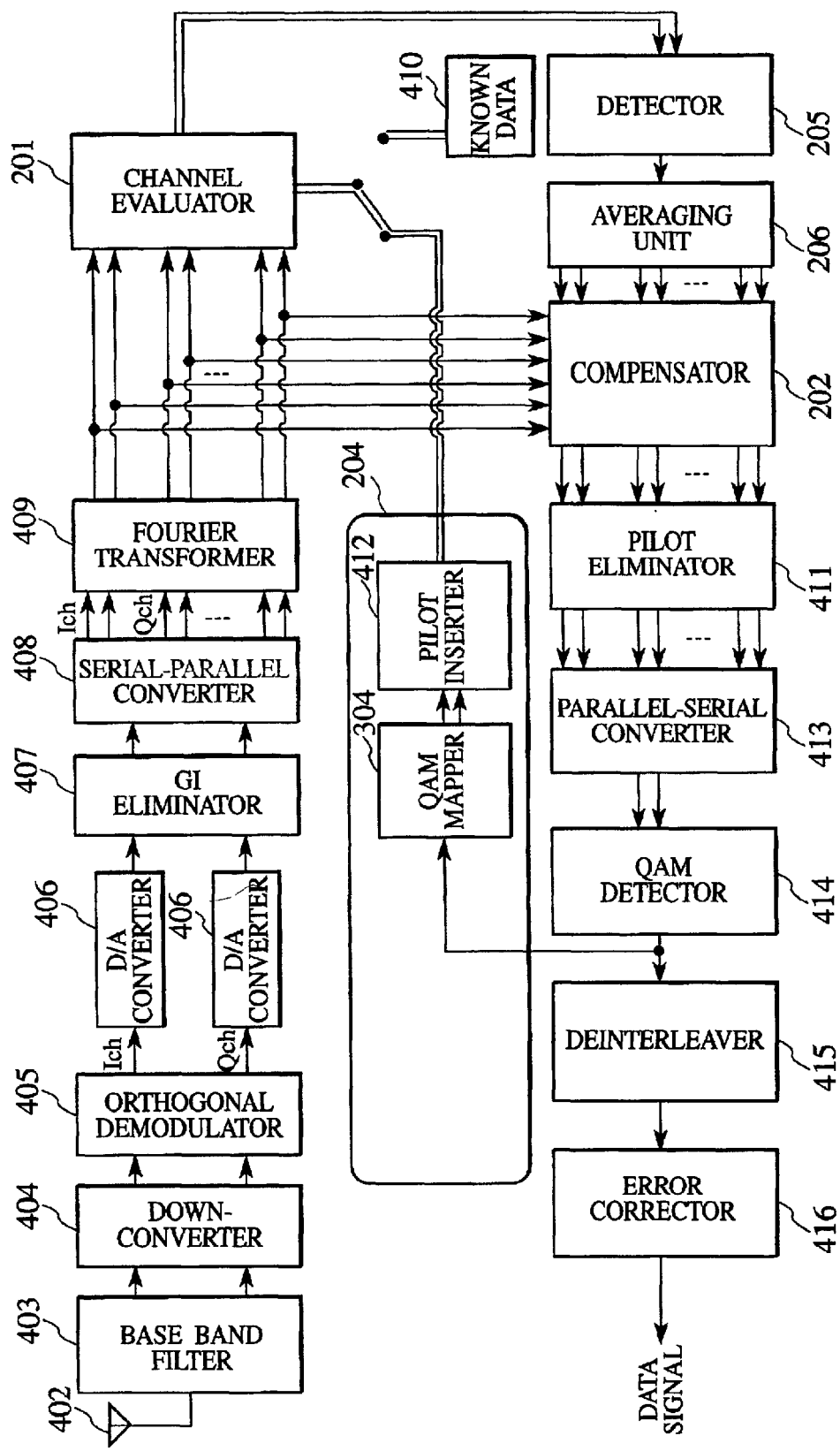
FIG. 9 is an exemplary diagram showing the schematic structure of a receiving apparatus according to another embodiment of the invention.

FIG. 9 is an exemplary diagram showing the schematic structure of a receiving apparatus according to another embodiment of the invention. This receiving apparatus will be discussed below referring to the diagram. Same reference numerals are given to those components which perform the same functions as the corresponding components of the receiving apparatus shown in FIG. 4.

A receiving apparatus 401 shown in FIG. 9 is designed to perform the same modulation as done in the transmitting apparatus by supplying the output of a QAM detector 414 directly to a QAM mapper 304, considering that the output is a restored signal.

Figure 10:
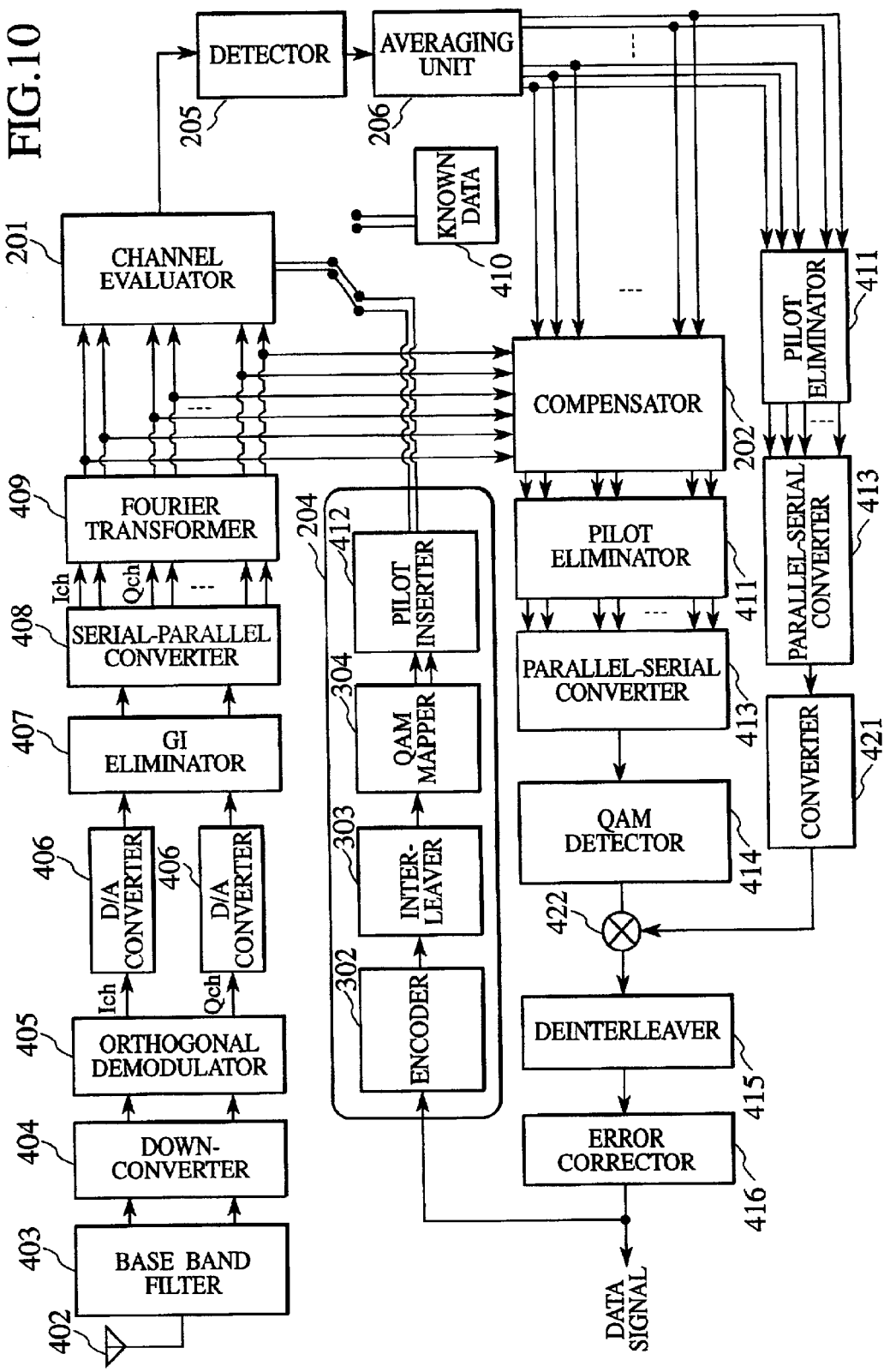
FIG. 10 is an exemplary diagram showing the schematic structure of a receiving apparatus according to a different embodiment of the invention.

FIG. 10 is an exemplary diagram showing the schematic structure of a receiving apparatus according to a different embodiment of the invention. Same reference numerals are given to those components which perform the same functions as the corresponding components of the receiving apparatuses shown in FIGS. 4 and 9.

The structure of a receiving apparatus 401 shown in FIG. 10 is the same as that of the previous embodiment, but is further used on averaged results.

Specifically, a pilot eliminator 411 eliminates a pilot signal portion from the result obtained by the averaging process done by an averaging unit 206. Further, as a parallel-serial converter 413 performs serial-parallel conversion, $H^{-1}$(f, n) is output at a certain point of time n for each frequency f. Therefore, a converter 421 copies the reciprocal of the absolute value of $H^{-1}$(f, n) by the number of transmission bits per symbol in the modulation system.

As the embodiment employs 16 QAM, four copies are made (two copies when QPSK is used). That is, at a certain point of time n, the converter 421 outputs

|H(f, n)|, |H(f, n)|, |H(f, n)|, |H(f, n)|.

Further, a multiplier 422 multiplies the signal after QAM detection by those values. While the output of the QAM detector 414 has been compensated by a compensator 202, it is not known in what transmission path condition the output has been obtained. Therefore, the aforementioned four pieces of information are multiplied to add those information to the signal, so that an error corrector 416 can be provided with the reliability information of the signal.

This embodiment proves that the present scheme can be used at the time of error correction as well as prediction of the distortion of the phase amplitude.

(Averaging On Frequency Axis or Time Axis)

The following will discuss a scheme of conducting an averaging process on the frequency axis and time axis.

Although the values of $G^{-1}$(n) are averaged in the above-described embodiment, the values of $|G^{-1}(n)|$ are averaged with weighting in this embodiment.

At the time of performing the averaging process, averaging on the frequency axis, averaging on the time axis or a combination of both can be used.

It is possible to select either weighted averaging or simple averaging at the time of performing the averaging process.

Figure 11:
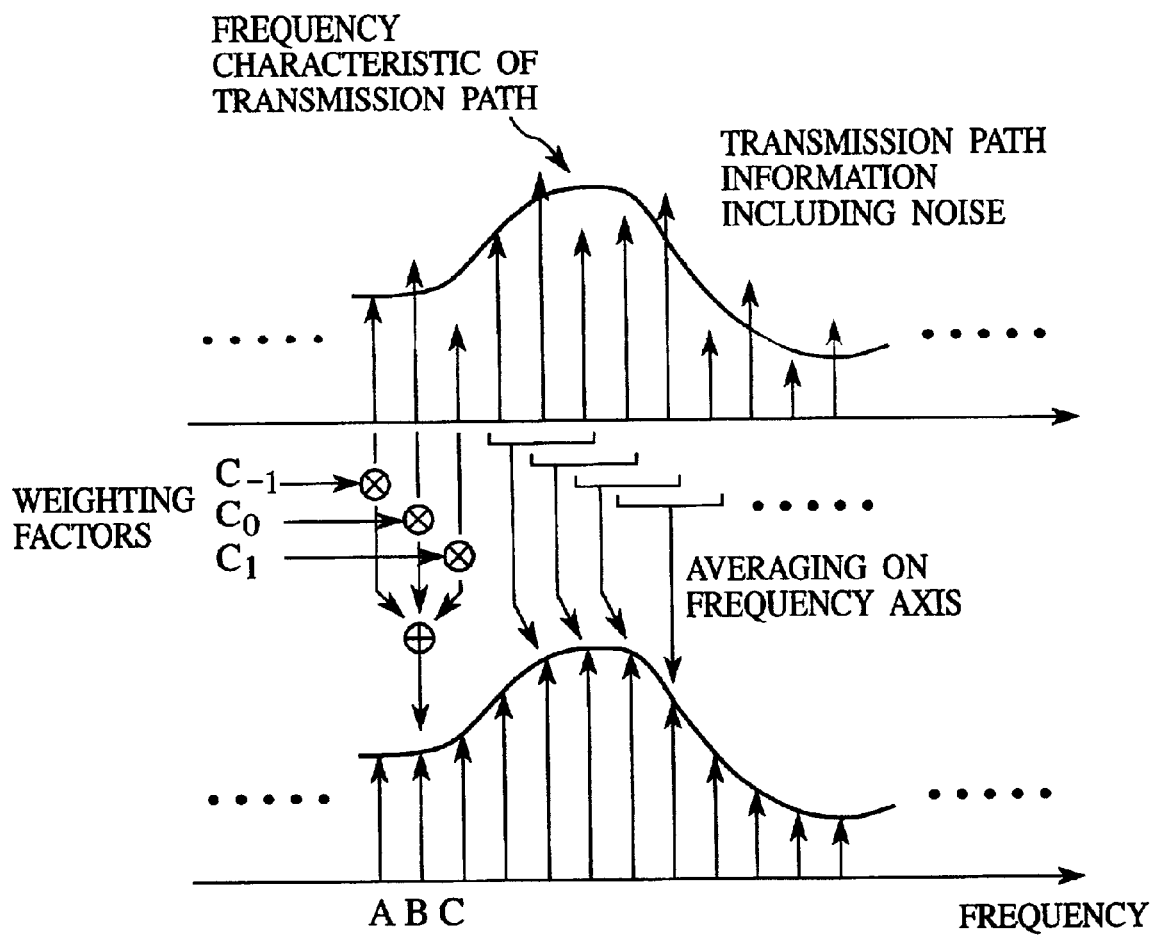
FIG. 11 is an explanatory diagram illustrating the outline of a scheme of averaging the frequency characteristic according to a further embodiment of the invention.

FIG. 11 illustrates the outline of a scheme of performing averaging on the frequency axis. As illustrated in the diagram, G(n) directly obtained from a measured value contains noise and tends to disperse over a predetermined range around the frequency characteristic of the transmission path. Therefore, weighted averaging is performed every given interval to suppress the influence of noise, so that the frequency characteristic of the transmission path is predicted accurately.

As apparent from the foregoing description, the invention can provide a receiving apparatus and a receiving method which are suitable for adaptively predicting the transmission characteristic in case where OFDM packet communication is executed under a fast mobile environment, a program which achieves the receiving apparatus and method, and a computer readable information recording medium which has the program recorded thereon.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-62112 filed on Mar. 6, 2001, and including specification, claims, drawings and summary. The disclosure of the above Japanese Patent Application is incorporated herein by reference in its entirety.

What is claimed is:

1. A receiving apparatus comprising:
a reception section that receives a result of transmitting a transmission signal obtained by modulating a known signal and a data signal and outputs said result as a reception signal;
a prediction section that predicts a transmission characteristic;
a compensation section that compensates that portion of said reception signal which corresponds to said data signal and which has not been compensated yet, using a predicted portion of said transmission characteristic, and outputs said compensated portion as a compensated data signal;
a demodulation section that demodulates said compensated data signal and outputs said demodulated signal as a demodulated data signal; and
a modulation section that modulates said demodulated data signal and outputs said modulated signal as a modulated data signal,
whereby said prediction section
(a) compares that portion of said reception signal which corresponds to said known signal with a result of modulating said known signal and compares that portion of said reception signal which corresponds to said data signal with that portion of said modulated data signal which corresponds to said data signal to acquire a time series of comparison results,
(b) replaces a value in said time series of comparison results which satisfies a predetermined exclusion condition with an old value of said time series of comparison results,
(c) averages a time series of comparison results resulting from that replacement, and
(d) lets a result of that averaging be a predicted transmission characteristic.

2. The receiving apparatus according to claim 1, wherein said prediction section averages said time series of comparison results by using an old value of a time series of said transmission characteristic as a value of a time series of said transmission characteristic which corresponds to that value of said time series of comparison results which does not satisfy said exclusion condition.

3. The receiving apparatus according to claim 1, wherein said prediction section (a) acquires a time series of amplitude phase ratios $G^{-1}(1)$, $G^{-1}(2)$, $G^{-1}(3)$, ... from following results (x) and (y):
(x) a result of performing complex division on a result of modulating said known signal with that portion of said reception signal which corresponds to said known signal, and
(y) a result of performing complex division on a that portion of said modulated signal which corresponds to said data signal with that portion of said reception signal which corresponds to said data signal;
(b) replaces an n-th value $G^{-1}(n)$ in said time series of amplitude phase ratios with a previous value $G^{-1}(n-q)$ ($1 \leq q < n$; q being an integer) to said value $G^{-1}(n)$ when a following exclusion condition is satisfied $$|G^{-1}(n)|/|G^{-1}(n-p)| > \lambda$$

where $G^{-1}(n-p)$ ($1 \leq p < n$; p being an integer) is a value previous to said value $G^{-1}(n)$ and $\lambda$ is a predetermined threshold value;
(c) acquires a time series of amplitude phase inverse change prediction values $H^{-1}(1)$, $H^{-1}(2)$, $H^{-1}(3)$, ... given that $H^{-1}(n)$ is an average value over a range of said time series of amplitude phase ratios $$G^{-1}(n-N+1), \ldots, G^{-1}(n-2), G^{-1}(n-1), G^{-1}(n)$$

$$(G^{-1}(m) = G^{-1}(1) \text{ when } m \leq 0)$$

where n is an n-th value in said time series of amplitude phase ratios and N is a predetermined positive integer; and
(d) lets said time series of amplitude phase inverse change prediction values $H^{-1}(1)$, $H^{-1}(2)$, $H^{-1}(3)$, ... be a predicted transmission characteristic.

4. The receiving apparatus according to claim 3, wherein said prediction section lets $$(1-t+t\mu)G^{-1}(n-1) + t(1-\mu)G^{-1}(n)$$

be $H^{-1}(n)$ by using a predetermined forget coefficient $\mu$ and a value v defined by a following equation $$v = |G^{-1}(n)|/|G^{-1}(n-p)|,$$

and a weight t defined by a following equation with respect to predetermined constants a and b (b>a>0)

$$t = -av + b \quad (v \leq b/a);$$

$$t = 0 \quad (v > b/a)$$

in place of said average value over said range of said time series of amplitude phase ratios.

5. The receiving apparatus according to claim 3, wherein said prediction section lets $$((N-t)/(N(N-1)))\Sigma_{i=n-N+1}^{n-1} G^{-1}(i) + (t/N)G^{-1}(n)$$

be $H^{-1}(n)$ by using a value v defined by a following equation $$v = |G^{-1}(n)|/|G^{-1}(n-p)|,$$

and a weight t defined by a following equation with respect to predetermined constants a and b (b>a>0)

$$t = -av + b \quad (v \leq b/a);$$

$$t = 0 \quad (v > b/a)$$

in place of said average value over said range of said time series of amplitude phase ratios.

6. The receiving apparatus according to claim 3, wherein said prediction section lets $H^{-1}(n-1)$ be $H^{-1}(n)$ in place of said average value over said range of said time series of amplitude phase ratios when said exclusion condition is satisfied for an integer n.

7. A receiving apparatus comprising:
a reception section that receives a result of transmitting a transmission signal obtained by modulating a known signal and a data signal and outputs said result as a reception signal by a multi-carrier transmission system using carrier frequencies orthogonal to each other;
a separation section that separates said reception signal to reception signals for respective carrier frequencies by serial-parallel conversion and fast Fourier transform and outputs said separated reception signals as separated signals;
a prediction section that predicts a transmission characteristic for each of said carrier frequencies;
a compensation section that compensates that portion of each of said reception signals which corresponds to said data signal and which has not been compensated yet, using a predicted portion of said transmission characteristic, and outputs those compensated portions as compensated data signals;
a restoration section that performs serial-parallel conversion on said compensated data signals and outputs resultant signals as a restored data signal; and
a modulation section that modulates said restored data signal and outputs said modulated signal as a modulated data signal,
whereby for that separated signal which is included in said separated signals and corresponds to each of said carrier frequencies, said prediction section
(a) compares that portion of said separated signal which corresponds to said known signal with a result of modulating said known signal and compares that portion of said separated signal which corresponds to said data signal with that portion of said modulated data signal which corresponds to said data signal to acquire a time series of comparison results,
(b) replaces a value in said time series of comparison results which satisfies a predetermined exclusion condition with an old value of said time series of comparison results,
(c) averages a time series of comparison results resulting from that replacement, and
(d) lets a result of that averaging be a predicted transmission characteristic.

8. The receiving apparatus according to claim 7, wherein said prediction section averages said time series of comparison results by using an old value of a time series of said transmission characteristic as a value of a time series of said transmission characteristic which corresponds to that value of said time series of comparison results which does not satisfy said exclusion condition.

9. The receiving apparatus according to claim 7, wherein for that separated signal which is included in said separated signals and corresponds to each of said carrier frequencies, said prediction section
(a) acquires a time series of amplitude phase ratios $G^{-1}(f, 1)$, $G^{-1}(f, 2)$, $G^{-1}(f, 3)$, ... from following results (x) and (y):
(x) a result of performing complex division on a result of modulating said known signal with that portion of said separated signal which corresponds to said known signal, and
(y) a result of performing complex division on a that portion of said modulated signal which corresponds to said data signal with that portion of said separated signal which corresponds to said data signal;
(b) replaces an n-th value $G^{-1}(f, n)$ in said time series of amplitude phase ratios with a previous value $G^{-1}(f, n-q)$ ($1 \leq q < n$; q being an integer) to said value $G^{-1}(f, n)$ when a following exclusion condition is satisfied $$|G^{-1}(f, n)|/|G^{-1}(f, n-p)| > \lambda$$

where $G^{-1}(f, n-p)$ ($1 \leq p < n$; p being an integer) is a value previous to said value $G^{-1}(f, n)$ and $\lambda$ is a predetermined threshold value;
(c) acquires a time series of amplitude phase inverse change prediction values $H^{-1}(, 1)$, $H^{-1}(f, 2)$, $H^{-1}(f, 3)$, ... given that $H^{-1}(f, n)$ is an average value over a range of said time series of amplitude phase ratios $$G^{-1}(f, n-N+1), \ldots, G^{-1}(f, n-2), G^{-1}(f, n-1), G^{-1}(f, n)$$

$$(G^{-1}(f, m) = G^{-1}(f, 1) \text{ when } m \leq 0)$$

where n is an n-th value in said time series of amplitude phase ratios and N is a predetermined positive integer; and
(d) lets said time series of amplitude phase inverse change prediction values $H^{-1}(f, 1)$, $H^{-1}(f, 2)$, $H^{-1}(f, 3)$, ... be a predicted transmission characteristic.

10. The receiving apparatus according to claim 9, wherein said prediction section lets $$(1-t+t\mu)G^{-1}(f, n-1) + t(1-\mu)G^{-1}(f, n)$$

be $H^{-1}(f, n)$ by using a predetermined forget coefficient $\mu$ and a value v defined by a following equation $$v = |G^{-1}(f, n)|/|G^{-1}(f, n-p)|,$$

and a weight t defined by a following equation with respect to predetermined constants a and b (b>a>0)

$$t = -av + b \ (v \leq b/a);$$

$$t = 0 \ (v > b/a)$$

in place of said average value over said range of said time series of amplitude phase ratios.

11. The receiving apparatus according to claim 9, wherein said prediction section lets $$((N-t)|(N(N-1)))\Sigma_{i=n-N+1}^{n-1} G^{-1}(f, i) + (t/N)G^{-1}(f, n)$$

be $H^{-1}(f, n)$ by using a value v defined by a following equation $$v = |G^{-1}(f, n)|/|G^{-1}(f, n-p)|,$$

and a weight t defined by a following equation with respect to predetermined constants a and b (b>a>0)

$$t = -av + b \ (v \leq b/a);$$

$$t = 0 \ (v > b/a)$$

in place of said average value over said range of said time series of amplitude phase ratios.

12. The receiving apparatus according to claim 9, wherein said prediction section lets $H^{-1}(f, n-q)$ be $H^{-1}(f, n)$ in place of said average value over said range of said time series of amplitude phase ratios when said exclusion condition is satisfied for an integer n.

13. A receiving method comprising:
a reception step that receives a result of transmitting a transmission signal obtained by modulating a known signal and a data signal and outputs said result as a reception signal;
a prediction step that predicts a transmission characteristic;
a compensation step that compensates that portion of said reception signal which corresponds to said data signal and which has not been compensated yet, using a predicted portion of said transmission characteristic, and outputs said compensated portion as a compensated data signal;
a demodulation step that demodulates said compensated data signal and outputs said demodulated signal as a demodulated data signal; and
a modulation step that modulates said demodulated data signal and outputs said modulated signal as a modulated data signal,
whereby said prediction step
(a) compares that portion of said reception signal which corresponds to said known signal with a result of modulating said known signal and compares that portion of said reception signal which corresponds to said data signal with that portion of said modulated data signal which corresponds to said data signal to acquire a time series of comparison results,
(b) replaces a value in said time series of comparison results which satisfies a predetermined exclusion condition with an old value of said time series of comparison results,
(c) averages a time series of comparison results resulting from that replacement, and
(d) lets a result of that averaging be a predicted transmission characteristic.

14. The receiving method according to claim 13, wherein said prediction step averages said time series of comparison results by using an old value of a time series of said transmission characteristic as a value of a time series of said transmission characteristic which corresponds to that value of said time series of comparison results which does not satisfy said exclusion condition.

15. The receiving method according to claim 13, wherein said prediction step
(a) acquires a time series of amplitude phase ratios $G^{-1}(1), G^{-1}(2), G^{-1}(3), \ldots$ from following results (x) and (y):
   (x) a result of performing complex division on a result of modulating said known signal with that portion of said reception signal which corresponds to said known signal, and
   (y) a result of performing complex division on a that portion of said modulated signal which corresponds to said data signal with that portion of said reception signal which corresponds to said data signal;
(b) replaces an n-th value $G^{-1}(n)$ in said time series of amplitude phase ratios with a previous value $G^{-1}(n-q)$ ($1 \leq q < n$; q being an integer) to said value $G^{-1}(n)$ when a following exclusion condition is satisfied $$|G^{-1}(n)|/|G^{-1}(n-p)|>\lambda$$

where $G^{-1}(n-p)$ ($1 \leq p < n$; p being an integer) is a value previous to said value $G^{-1}(f, n)$ and $\lambda$ is a predetermined threshold value;

(c) acquires a time series of amplitude phase inverse change prediction values $H^{-1}(1), H^{-1}(2), H^{-1}(3), \ldots$ given that $H^{-1}(n)$ is an average value over a range of said time series of amplitude phase ratios $$G^{-1}(n-N+1), \ldots, G^{-1}(n-2), G^{-1}(n-1), G^{-1}(n)$$

$$(G^{-1}(m)=G^{-1}(1) \text{ when } m \leq 0)$$

where n is an n-th value in said time series of amplitude phase ratios and N is a predetermined positive integer; and
(d) lets said time series of amplitude phase inverse change prediction values $H^{-1}(1), H^{-1}(2), H^{-1}(3), \ldots$ be a predicted transmission characteristic.

16. The receiving method according to claim 15, wherein said prediction step lets $$(1-t+t\mu)G^{-1}(n-1)+t(1-\mu)G^{-1}(n)$$

be $H^{-1}(n)$ by using a predetermined forget coefficient $\mu$ and a value v defined by a following equation $$v=|G^{-1}(n)|/|G^{-1}(n-p)|,$$

and a weight t defined by a following equation with respect to predetermined constants a and b (b>a>0)

$$t=-av+b \ (v \leq b/a);$$

$$t=0 \ (v>b/a)$$

in place of said average value over said range of said time series of amplitude phase ratios.

17. The receiving method according to claim 15, wherein said prediction step lets $$((N-t)/(N(N-1)))\Sigma_{i=n-N+1}^{n-1}G^{-1}(i)+(t/N)^{G-1}(n)$$

be $H^{-1}(n)$ by using a value v defined by a following equation $$v=|G^{-1}(n)|/|G^{-1}(n-p)|,$$

and a weight t defined by a following equation with respect to predetermined constants a and b (b>a>0)

$$t=-av+b \ (v \leq b/a);$$

$$t=0 \ (v>b/a)$$

in place of said average value over said range of said time series of amplitude phase ratios.

18. The receiving method according to claim 15, wherein said prediction step lets $H^{-1}(n-q)$ be $H^{-1}(n)$ in place of said average value over said range of said time series of amplitude phase ratios when said exclusion condition is satisfied for an integer n.

19. A receiving method comprising:
a reception step that receives a result of transmitting a transmission signal obtained by modulating a known signal and a data signal and outputs said result as a reception signal by a multi-carrier transmission system using carrier frequencies orthogonal to each other;
a separation step that separates said reception signal to reception signals for respective carrier frequencies by serial-parallel conversion and fast Fourier transform and outputs said separated reception signals as separated signals;
a prediction step that predicts a transmission characteristic for each of said carrier frequencies;

a compensation step that compensates that portion of each of said reception signals which corresponds to said data signal and which has not been compensated yet, using a predicted portion of said transmission characteristic, and outputs those compensated portions as compensated data signals;

a restoration step that performs serial-parallel conversion on said compensated data signals and outputs resultant signals as a restored data signal; and a modulation step that modulates said restored data signal and outputs said modulated signal as a modulated data signal, whereby for that separated signal which is included in said separated signals and corresponds to each of said carrier frequencies, said prediction step (a) compares that portion of said separated signal which corresponds to said known signal with a result of modulating said known signal and compares that portion of said separated signal which corresponds to said data signal with that portion of said modulated data signal which corresponds to said data signal to acquire a time series of comparison results, (b) replaces a value in said time series of comparison results which satisfies a predetermined exclusion condition with an old value of said time series of comparison results, (c) averages a time series of comparison results resulting from that replacement, and (d) lets a result of that averaging be a predicted transmission characteristic.

20. The receiving method according to claim 19, wherein said prediction step averages said time series of comparison results by using an old value of a time series of said transmission characteristic as a value of a time series of said transmission characteristic which corresponds to that value of said time series of comparison results which does not satisfy said exclusion condition.

21. The receiving method according to claim 19, wherein for that separated signal which is included in said separated signals and corresponds to each of said carrier frequencies, said prediction step (a) acquires a time series of amplitude phase ratios $G^{-1}(f, 1)$, $G^{-1}(f, 2)$, $G^{-1}(f, 3)$, ... from following results (x) and (y):

(x) a result of performing complex division on a result of modulating said known signal with that portion of said separated signal which corresponds to said known signal, and (y) a result of performing complex division on a that portion of said modulated signal which corresponds to said data signal with that portion of said separated signal which corresponds to said data signal;

(b) replaces an n-th value $G^{-1}(f, n)$ in said time series of amplitude phase ratios with a previous value $G^{-1}(f, n-q)$ ($1 \leq q < n$; q being an integer) to said value $G^{-1}(f, n)$ when a following exclusion condition is satisfied $$|G^{-1}(f, n)|/|G^{-1}(f, n-p)| > \lambda$$

where $G^{-1}(f, n-p)$ ($1 \leq p < n$; p being an integer) is a value previous to said value $G^{-1}(f, n)$ and $\lambda$ is a predetermined threshold value;

(c) acquires a time series of amplitude phase inverse change prediction values $H^{-1}(f, 1)$, $H^{-1}(f, 2)$, $H^{-1}(f, 3)$, ... given that $H^{-1}(f, n)$ is an average value over a range of said time series of amplitude phase ratios $$G^{-1}(f, n-N+1), \ldots, G^{-1}(f, n-2), G^{-1}(f, n-1), G^{-1}(f, n)$$

$$(G^{-1}(f, m) = G^{-1}(f, 1) \text{ when } m \leq 0)$$

where n is an n-th value in said time series of amplitude phase ratios and N is a predetermined positive integer; and (d) lets said time series of amplitude phase inverse change prediction values $H^{-1}(f, 1)$, $H^{-1}(f, 2)$, $H^{-1}(f, 3)$, ... be a predicted transmission characteristic.

22. The receiving method according to claim 21, wherein said prediction step lets $$(1-t+t\mu)G^{-1}(f, n-1) + t(1-\mu)G^{-1}(f, n)$$

be $H^{-1}(f, n)$ by using a predetermined forget coefficient $\mu$ and a value v defined by a following equation $$v = |G^{-1}(f, n)|/|G^{-1}(f, n-p)|,$$

and a weight t defined by a following equation with respect to predetermined constants a and b (b>a>0)

$$t = -av + b \ (v \leq b/a);$$

$$t = 0 \ (v > b/a)$$

in place of said average value over said range of said time series of amplitude phase ratios.

23. The receiving method according to claim 21, wherein said prediction step lets $$((N-t)/(N(N-1))) \Sigma_{i=n-N+1}^{n-1} G^{-1}(f, i) + (t/N) G^{-1}(f, n)$$

be $H^{-1}(f, n)$ by using a value v defined by a following equation $$v = |G^{-1}(f, n)|/|G^{-1}(f, n-p)|,$$

and a weight t defined by a following equation with respect to predetermined constants a and b (b>a>0)

$$t = -av + b \ (v \leq b/a);$$

$$t = 0 \ (v > b/a)$$

in place of said average value over said range of said time series of amplitude phase ratios.

24. The receiving method according to claim 21, wherein said prediction step lets $H^{-1}(f, n-q)$ be $H^{-1}(f, n)$ in place of said average value over said range of said time series of amplitude phase ratios when said exclusion condition is satisfied for an integer n.

25. A program product for allowing a computer to function as:

a reception section that receives a result of transmitting a transmission signal obtained by modulating a known signal and a data signal and outputs said result as a reception signal;

a prediction section that predicts a transmission characteristic;

a compensation section that compensates that portion of said reception signal which corresponds to said data signal and which has not been compensated yet, using a predicted portion of said transmission characteristic, and outputs said compensated portion as a compensated data signal;

a demodulation section that demodulates said compensated data signal and outputs said demodulated signal as a demodulated data signal; and a modulation section that modulates said demodulated data signal and outputs said modulated signal as a modulated data signal, whereby said prediction section
(a) compares that portion of said reception signal which corresponds to said known signal with a result of modulating said known signal and compares that portion of said reception signal which corresponds to said data signal with that portion of said modulated data signal which corresponds to said data signal to acquire a time series of comparison results,
(b) replaces a value in said time series of comparison results which satisfies a predetermined exclusion condition with an old value of said time series of comparison results,
(c) averages a time series of comparison results resulting from that replacement, and
(d) lets a result of that averaging be a predicted transmission characteristic.

26. A computer readable information recording medium on which the program as recited in claim 25, wherein said information recording medium includes one of a compact disk, a floppy disk, a hard disk, a magneto-optical disk, a digital video disk, a magnetic tape and a semiconductor memory.

* * * * *